United States Patent [19]

Tchernev

[11] Patent Number: 5,729,988
[45] Date of Patent: Mar. 24, 1998

[54] HEAT PUMP ENERGIZED BY LOW-GRADE HEAT SOURCE

[76] Inventor: Dimiter I. Tchernev, 32 Shadow Oak Dr., Sudbury, Mass. 01776

[21] Appl. No.: 140,890

[22] Filed: Jan. 4, 1988

Related U.S. Application Data

[63] Continuation-in-part of Ser. No. 801,491, Nov. 18, 1985, Pat. No. 4,637,218, and a continuation of Ser. No. 817,854, Dec. 30, 1985, abandoned, which is a continuation-in-part of Ser. No. 605,812, May 1, 1984, abandoned, which is a continuation-in-part of Ser. No. 11,689, Feb. 12, 1979, Pat. No. 4,584,842, which is a continuation-in-part of Ser. No. 710,609, Aug. 2, 1976, Pat. No. 4,138,870, which is a division of Ser. No. 520,808, Nov. 4, 1974, Pat. No. 4,034,569, said Ser. No. 801,491, is a continuation of Ser. No. 605,812.

[30] Foreign Application Priority Data

Apr. 30, 1985 [WO] WIPO ............... PCT/US85/00783

[51] Int. Cl.⁶ ...................................................... E25B 17/00
[52] U.S. Cl. ........................... 62/106; 62/235.1; 62/480
[58] Field of Search ............................. 62/235.1, 480, 62/490; 126/428; 165/142, 486; 22/106

[56] References Cited

U.S. PATENT DOCUMENTS

| | | | |
|---|---|---|---|
| 1,833,901 | 12/1931 | Hull | 62/480 X |
| 4,121,428 | 10/1978 | Glenn | 62/235.1 |
| 4,138,850 | 2/1979 | Tchernen | 62/235.1 X |
| 4,165,952 | 8/1979 | Bennett | 62/235.1 X |
| 4,183,227 | 1/1980 | Bouvin et al. | 62/480 |
| 4,187,688 | 2/1980 | Berg | 62/235.1 |
| 4,231,772 | 11/1980 | Berg | 126/428 X |
| 4,610,148 | 9/1986 | Shelton | 62/480 |

*Primary Examiner*—John M. Sollecito
*Attorney, Agent, or Firm*—Penrose Lucas Albright

[57] ABSTRACT

A heat pump using zeolite as an adsorbent wherein thermal energy from adsorbent zeolite in one hermetically sealed space is used to heat desorbing zeolite located in another hermetically sealed space, such heat being conveyed by heat exchanger conduits containing a heat transfer fluid which, before heating the desorbed zeolite, has its temperature increased to within a range of about 200° F. (93° C.) to 400° F. (205° C.) by a gas flame or other heat source, the adsorption and desorption phases being changed between the zeolites in each cycle by reversing the fluid flow in the conduits. Cooling and heating for a building or other purposes are provided through the condenser and evaporator respectively for the working gas (water) which is desorbed and adsorbed into the zeolites. A propagating temperature front is established through the fluid-to-zeolite heat exchanger conduits to provide a utilization of as much as 90% of thermal energy available during the desorption/adsorption phases. The heating and cooling capacity of the system is modulated by varying (1) the heat transfer fluid flow rate, (2) the heat output from the heat source, or (3) the amount of the temperature increase of the heat transfer fluid when its flow is reversed.

85 Claims, 12 Drawing Sheets

Simplified Concept of Zeolite Cycle

Typical Isosteres for Zeolite & Water Vapor

Equilibrium H$_2$O Loading:
Lb. of adsorbed H$_2$O
100 lb. of activated Linde molecular sieve type 13X
Activation conditions
350°C and <10 Microns Hg Anticipated Temperature-Time Profile of Conventional Zeolite Heat Exchanger Anticipated Temperature-Time Profile of New Zeolite Heat Exchanger

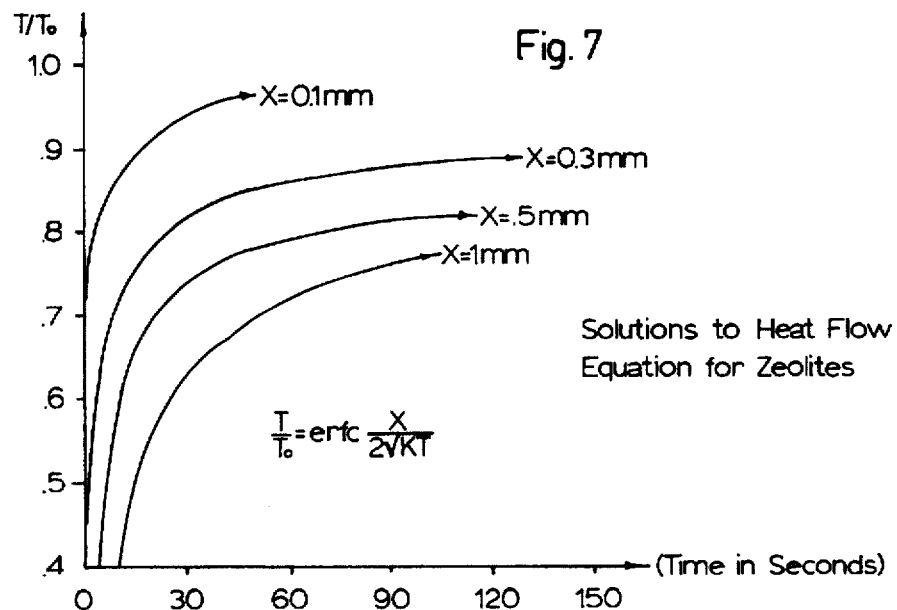
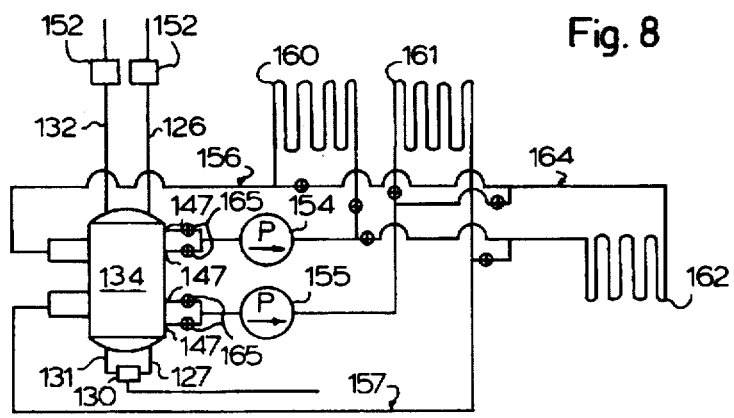

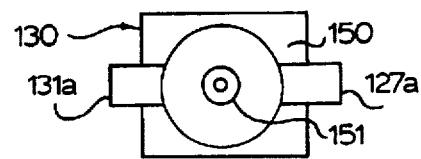
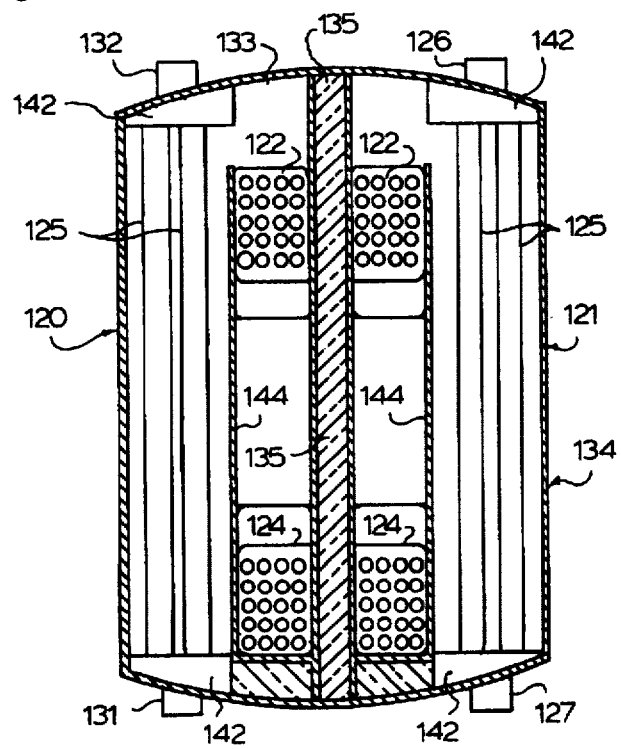
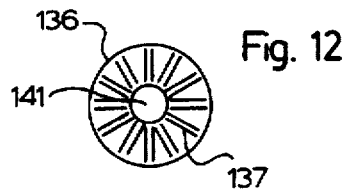
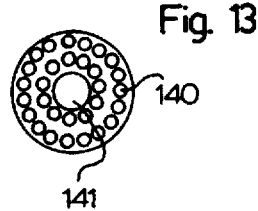
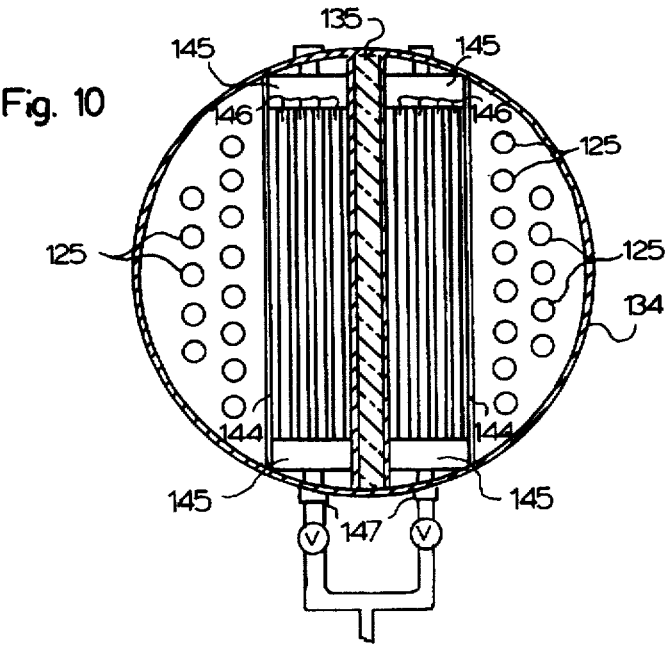

Zeolite Cycle

Gas/Fluid flow

Gas/Fluid flow

HEAT PUMP ENERGIZED BY LOW-GRADE HEAT SOURCE

RELATED U.S. APPLICATION DATA

This application is a continuation of Ser. No. 817,854, filed Dec. 30, 1985, abandoned, which is a continuation of PCT Application PCT/US/8500783, filed Apr. 30, 1985, which is a continuation-in-part of application Ser. No. 605,812, filed May 1, 1984, abandoned (which as a continuation, Ser. No. 801,491, filed Nov. 18, 1985, issued as U.S. Pat. No. 4,637,218), which is a continuation-in-part of Ser. No. 11,689, Feb. 12, 1979, U.S. Pat. No. 4,584,842, which is a continuation-in-part of Ser. No. 710,609, Aug. 2, 1976, U.S. Pat. No. 4,138,870, which is a division of Ser. No. 520,808, Nov. 4, 1974, U.S. Pat. No. 4,034,569.

BACKGROUND OF THE INVENTION

This invention relates to a novel heat pump system which uses low-grade energy sources such as provided by air heated by the combustion of gas, oil, exhaust gases, geothermal fluids, waste gases and solar energy. The heat pump system is capable of providing both space heating and cooling requirements.

For over forty years, residential and small commercial buildings have been cooled almost exclusively by electrically driven compressor air conditioning units. The primary reasons for this are: (1) the relatively low initial cost of the equipment; (2) a high coefficient of performance, usually two to three, which, together, with dependability and long equipment lifetime provides low operating costs; and (3) the use of air-cooled condensers and evaporators which reduces the system's complexity and costs. The coefficient of performance (COP) equals refrigeration effect (Q) divided by net work input (W). This may be expressed as COP= 778Q/W where "Q" is the heat in BTUs absorbed by the unit per pound refrigerant and "W" is the work in foot pounds supplied to the unit by the compresser.

Existing gas-fired cooling systems generally have on the other hand: (1) a low coefficient of performance, usually less than 0.7 and therefore relatively high operating costs; (2) the need for a cooling tower to serve for the purposes of the condenser which increases the initial and operating cost of the system; and (3) usually require the use of corrosive substances such as ammonia or lithium bromide solutions that reduce equipment lifetime and increase maintenance and operating costs.

As a result, whereas the residential market for gas is substantial in the winter and when heating is otherwise required, it is not significant in the cooling season. This contributes to poor utilization of distribution and storage capacities of the gas and liquid fuel industries as well as for the electric utilities.

With the introduction of electrically driven heat pumps which have a coefficient of performance of three to four and are capable of both heating and cooling, it can be anticipated that the efficient distribution of gas and liquid fuel from producer to consumer will be further eroded. If this is not to occur, a gas-energized cooling system must be provided which is realistically competitive with conventional existing air-conditioning systems for relatively small buildings. If such system is to be competitive, it must have a coefficient of performance reasonably competitive with that of the electrically driven heat pump and otherwise be competitive which means that it have the same low initial equipment costs, long equipment lifetime and dependability of conventional heating and cooling systems, or better.

The coefficient of performance of gas fired cooling systems may be increased by utilizing the heat of combustion in a two-stage absorption system. Unfortunately, due to the complexity of such systems including the need for a cooling tower, the initial investment and operating and maintenance requirements are not as a practical matter compatible with residential and small building heating and cooling needs.

Improvements in the efficiency of energy intensive systems can often be gained through the use of energy recycling methods. The principle of energy recycling is old and has been used in practical applications since at least the 1920's. The device employed for this purpose is usually called a regenerator and is used extensively in combination with gas turbines in large power plants. A regenerator may be a rotor having cylindrical heat transfer packing through which hot and cold gases are passed. Heat temporarily stored in such packing from the hot gas is transferred into the cold gas stream by steadily rotating the cylindrical body which temporarily stores the thermal energy. Fixed two-bed regenerator systems are also known. Fixed two-bed systems comprise two containers of heat storage material wherein the storage and recovery of heat is accomplished by the reversal of gas flow in the fixed-bed system. The closing and opening of relevant valves controlling the hot/cold gas allows the start of the flow of the cold/hot gas through the packing. With the two-bed regenerator system, one of the regenerators is, at any instant, preheating the cold gas while the other bed is cooling the hot gas. Regenerators are common in glass making furnaces where they must be able to withstand entrance gas temperatures on the order of 1600° C. The state of the art on existing commercial devices used for the recycling of energy may be found in "Thermal Energy Storage and Regeneration" by Schmidt and Willmott, published in 1981 by Hemisphere Publishing Corporation, McGraw-Hill. Attention is also invited to U.S. Pat. No. 4,183,227 issued Jan. 15, 1980 to J. Bouvin et al.

SUMMARY OF THE INVENTION

The instant invention is an adsorption system heat pump, preferably gas fired, which has a cooling coefficient of performance of at least one and possibly as high as two and a heating coefficient of performance of two or more, depending on the specific cooling and heating requirements and available energy, such coefficient approaching the system's Carnot efficiency which, in terms of the coefficient of performance, is three to four. This is an increase of two to three times the presently obtainable values with single-stage adsorptions or absorption systems and approaches the efficiency of electrically driven heat pumps which are burdened by significantly higher power costs.

The adsorption system heat pump of the instant invention is, moreover, simple in design and has a relatively low initial cost and long lifetime with little or no maintenance.

Of course, an increased coefficient of performance can be obtained in known systems with two-stage adsorption systems. But, the complexity of the system is increased considerably and the need for a cooling tower is not eliminated. Accordingly, two-state systems are not generally suitable for relatively small installations due to their substantially greater initial equipment costs as well as their operating and maintenance costs.

Prior concepts of the inventor wherein zeolite is utilized as an adsorbent are disclosed in U.S. Pat. No. 4,034,569 of Jul. 12, 1977, U.S. Pat. No. 4,138,850 of Feb. 13, 1979 and copending application Ser. No. 11,689 filed Feb. 12, 1979. Such disclosures are incorporated herein by reference.

Although, like the inventor's prior concepts, the invention herein utilizes zeolite as an adsorbent for a refrigerant gas, prior emphasis has been on cooling whereas the instant concept is directed more specifically to a heat pump which is capable of providing both heating and cooling and employs two energy conversion units. One unit can be desorbing while the other unit is adsorbing, the thermal energy from the adsorbing zeolite being used in part to heat the desorbing zeolite. In addition, the invention employs the development of a temperature front which propagates through the metal-zeolite heat exchanger. Creation of a temperature front permits reuse of as much as ninety percent of the thermal energy available during the sorption processes. The use of zeolite as the adsorbent, two energy converters with heat exchange and the propagating temperature front through the heat exchanger, results in the coefficient of performance obtained by the apparatus and process approaching the theoretical Carnot efficiency of three to four. In other words, the gas-fired zeolite heat pump of the instant invention is substantially as efficient as an electrical heat pump having, however, the further advantage of a markedly reduced operation costs.

Although natural gas or oil or any gaseous or liquid fuel which produces hot gases of combustion may be used for the system, it also may employ the waste heat generated by the internal combustion engine or any other source of hot gas or liquid which provides a temperature in the range of 250° to 400° F. (120° to 205° C.). For example, there are various types of solar collectors which can generate temperatures up to 600° F. (315° C.). There is also a need in various manufacturing and process plants to dissipate waste heat which could be used as the heat-energy source for the instant invention. As a general proposition, any fluid source at temperatures higher than those required can be thermally diluted through a number of mechanisms by further fluid having a cooler temperature and this may or may not involve intermixing of fluids. With natural gas or oil, the ultimate temperature is, in fact, lowered by direct intermixing of outside air with the gases of combustion to provide the fluid temperature desired. Accordingly, although the ultimate heat source may not be "low-grade", by the intermixing of other fluids, it is converted into the equivalent of a low-grade heat source. For the purposes of this application, a low-grade heat source is considered any heat source reasonably compatible with the system wherein an effective heat differential can be provided, the maximum requisite differential being roughly less then 200° C. or 360° F.

The preferred adsorbent is a zeolite either natural or artificial although the natural zeolites are preferred. Operable natural zeolites include chabazite, clinoptilolite, mordenite, erionite and others. An acceptable synthetic zeolite is manufactured by Union Carbide and is known as Linde molecular sieve type 13X. Numerous patents have issued which describe various molecular sieve zeolites, these include U.S. Pat. Nos. 2,882,243, 2,882,244, 3,012,853, 3,130,007, 3,181,231, 3,329,629, 3,720,756, 3,808,326, 3,941,871, 3,969,276, 3,972,983, 3,976,598, 3,979,335, 4,016,245, 4,034,065, and 4,046,859.

The publication "Natural Zeolites, Occurrence, Properties, Use" edited by L. B. Sand and F. A. Mumpton, Peragamon Press, provides considerable information on various types of natural zeolites. Zeolites are molecular sieves which in their dehydrated state comprise crystals interlaced with regularly spaced channels of molecular dimensions. This network of uniform channels or pores comprises almost fifty percent of the total volume in the crystals. Empty cavities of such molecular sieves have a strong tendency to capture water molecules. The interaction of the dipole or quadrupole moment of gas molecules with the non-uniform electric fields generated in the crystalline structure of the zeolite, is strong and nonlinear.

The inventive concepts disclosed herein involve at least two energy converters which are contained in respective separate sealed containers so that when the heat pump is energized one of the energy converters or containers is always in the desorption part of the cycle. The use of two separate zeolite containers allows for the exchange of thermal energy from the container being cooled which is in the adsorption part of the cycle to the container being heated which is in the desorption part of the cycle. This results in a system which can provide an extremely high coefficient of performance. If only about thirty percent of the energy is exchanged, the heating coefficient of the cycle increases from about 0.7 to above one and the heating coefficient of performance is increased to above two. If sixty-five percent of the energy is recycled, the cooling coefficient of performance increases to two and the heating coefficient of performance increases to about three.

It is to be emphasized that since the system is cyclic and maximum efficiency is obtained by continuous recycling of the energy converters, the advantages of continuous operation suggest greater efficiency may be obtained in a typical heating system with the utilization of more than two energy converters whereby periodic complete shut-off of the system is avoided. Thus, although the system described herein has only two energy converters, it will be understood by those skilled in the art that further converters may be added to the system in various arrangements.

The primary object of the instant invention is to provide a gas adsorption heat pump with significantly increased coefficient of performance in both its heating and cooling modes whereby it is economically competitive with electrically driven heat pumps.

Further objects, adaptabilities and capabilities of the invention will appear as the description progresses, reference being had to the accompanying drawings in which:

BRIEF DESCRIPTION OF THE DRAWINGS

FIG. 7 is a graph which shows time duration solutions to the heat flow equation for zeolites of various thicknesses to obtain the profile shown in FIG. 6;

FIG. 8 is a schematic of energy converters in accordance with the instant invention incorporated into the heating and cooling system of a building;

FIG. 9 illustrates an embodiment in a partial section elevational view wherein two energy converters are within a single pressure container;

FIG. 10 is a sectional plan view of the container and energy converters shown in FIG. 9;

FIG. 11 illustrates diagrammatically a gas burner which is employed with the container and energy converters shown in FIGS. 9 and 10;

FIG. 12 is a bottom plan view of a packet or tile containing zeolite which is received by the fluid passageways for combustion and cooling gases in FIG. 9;

FIG. 13 is a top plan view of the packet shown in FIG. 12;

DESCRIPTION OF THE PREFERRED EMBODIMENTS

As indicated above, zeolites form a family of materials with a unique, open, cage-like crystalline structure. Their atomic structure is such that cavities interconnected by channels or tunnels are formed on an atomic scale. There are over thirty types of zeolites with cavity sizes ranging from three to over ten angstroms and connecting channels of various sizes.

Figure 1:
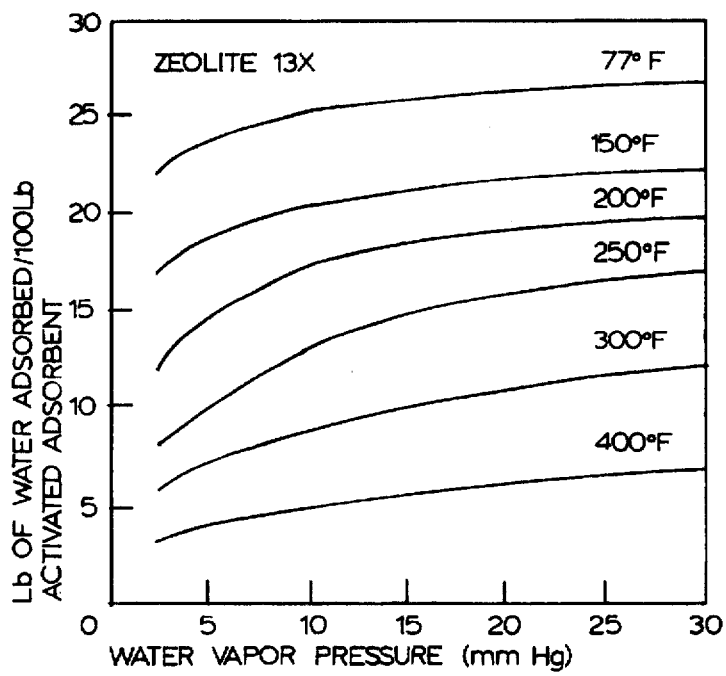
FIG. 1 is a diagram showing the amount of water adsorbed by a zeolite molecular sieve at various temperatures and absolute pressures of water vapor measured in millimeters of mercury.
Figure 2:
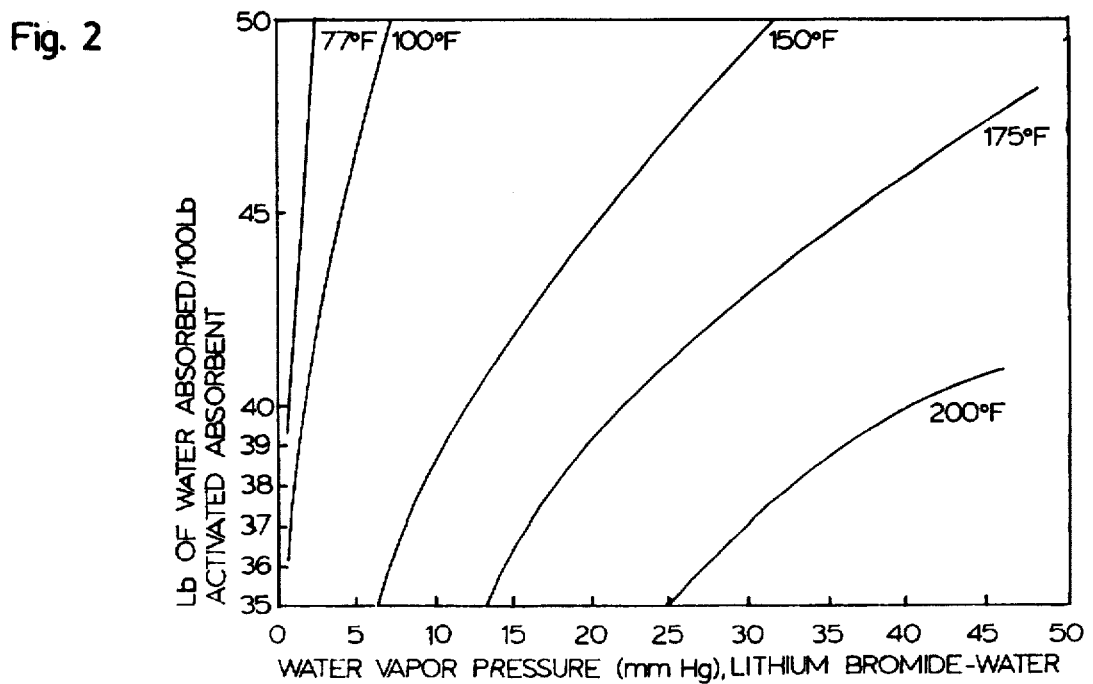
FIG. 2 is a diagram similar to FIG. 1 except it shows the amount of water absorbed by lithium bromide at various temperatures and absolute water vapor pressures measured in millimeters of mercury.

Because of this open porous structure, zeolites are capable of adsorbing large amounts of a variety of refrigerant gases ranging from water vapor, ammonia and carbon dioxide to different fluorocarbons, chlorocarbons and hydrocarbons at near room temperatures. The strong non-uniform internal electric fields which occur at the atomic level in the zeolite structure in interaction with the polar moments of gas molecules results in an adsorption energy. The interaction is extremely nonlinear and exhibits saturation behavior in its pressure dependence. FIG. 1 presents the adsorption isotherms of water vapor and zeolite. FIG. 2 presents comparable adsorption isotherms for a lithium bromide water system. The non-linearity and saturation behavior of zeolites is obvious and at pressures above ten millimeters mercury absolute, the adsorbed amount is almost independent of pressure and entirely dependent on temperature.

The solubility of ammonia in water, of water vapor in lithium bromide and the adsorption of refrigerant gases on surface adsorbents such as silica gel, activated alumina and activated carbon depend exponentially on $\Delta H/RT$ where $\Delta H$ is the energy of solution of adsorption and T is the absolute temperature and R is the gas constant. In other words, they obey the Arrhenius equation. Adsorption in zeolites, in contrast, are shown by Dubinin (M. M. Dubinin & V. A. Astakov, "Molecular Sieve Zeolites - II", American Chemical Society, Washington, D.C. 1971, pp. 69–85) to depend exponentially on at least the second and as high as the fifth power of $\Delta H/RT$. This extreme non-linearity of thermoactivation makes zeolites well suited for heat pump applications by reducing the influence of condensation pressure and temperature on the-coefficient of performance of the cycle.

Figure 3:
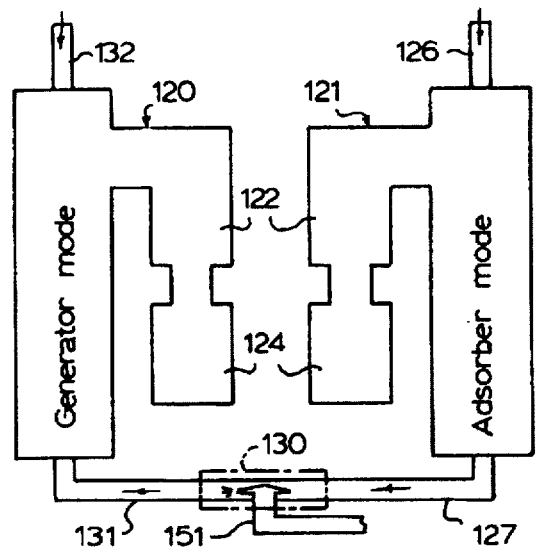
FIG. 3 illustrates schematically a simplified concept of the zeolite cycle in accordance with the instant invention.

The concept of the zeolite cycle of the instant invention is shown schematically in FIG. 3. The zeolite is divided into two separate hermetically sealed spaces, enclosures or containers of energy converters designated generally by reference numerals 120 and 121. Each space is provided with its own condenser 122 and its own evaporator 124 which can in fact be a single structure as will be explained hereinbelow.

In FIG. 3, converter 120 is in the generator mode whereas converter 121 is in the adsorber mode. Both converters 120 and 121 have extending vertically therethrough a plurality of heat exchange fluid conduits 125 (see FIGS. 9 and 10). Such conduits are surrounded by zeolite adsorbent in a manner to be subsequently described. When heat exchange fluid enters, it is received by the conduits 125 (FIG. 9) and is preheated by the heat in the zeolite and structure of converter 121, such heat having been provided when converter 121 was in its previous generator mode. The zeolite and associated structure in converter 121 cool slowly and as the zeolite cools, it absorbs refrigerant vapor from the converter's evaporator 124. The evaporation of refrigerant at the evaporator provides cooling which may be employed to cool a building or rejected to the atmosphere. The generated heat of adsorption plus the specific heat of the zeolite and associated structure in converter 121 increases the temperature of the heat exchange fluid passing through conduits 125 to a temperature which is decreasing in time but remains above about 100° F. (38° C.). Thus heat exchange fluid enters from inlet conduit 126 and travels through conduits 125 and exits the converter 121 through a bottom conduit 127. Heat exchange fluid from bottom conduit 127 passes through a heating station 130 (FIG. 3) which comprises a source of heat such as a burner 151 that provides a gas flame to heat the heat exchange fluid. The heat exchange fluid is conveyed through a further bottom conduit 131 of converter 120 and into its fluid conduit 125 wherein the heated heat exchange fluid heats the zeolite causing it to desorb. The gas combustion is controlled, as necessary, by means well known in the art to heat and maintain for the part of the cycle, the heat exchange fluid in conduit 131 at about 400° F. (205° C.) before it enters conduit 125 in converter 120. Here, the zeolite which has been cooled to about 95° F. (35° C.) during the previous cycle is heated to the temperature of about 400° F. (205° C.). As it is heated, the refrigerant gas is desorbed and pressure in the converter 120 increases so that the desorbed vapor can be condensed at a relatively high temperature (about 100° F. (38° C.)). The heat of condensation which takes place in the condenser 122 of converter 120 is rejected to the outside air to a heat sink or is used, in part, for heating needs such as heating water during the cooling season. During the heating season, however, the heat is used to provide part or all of the heating load.

Figure 14:
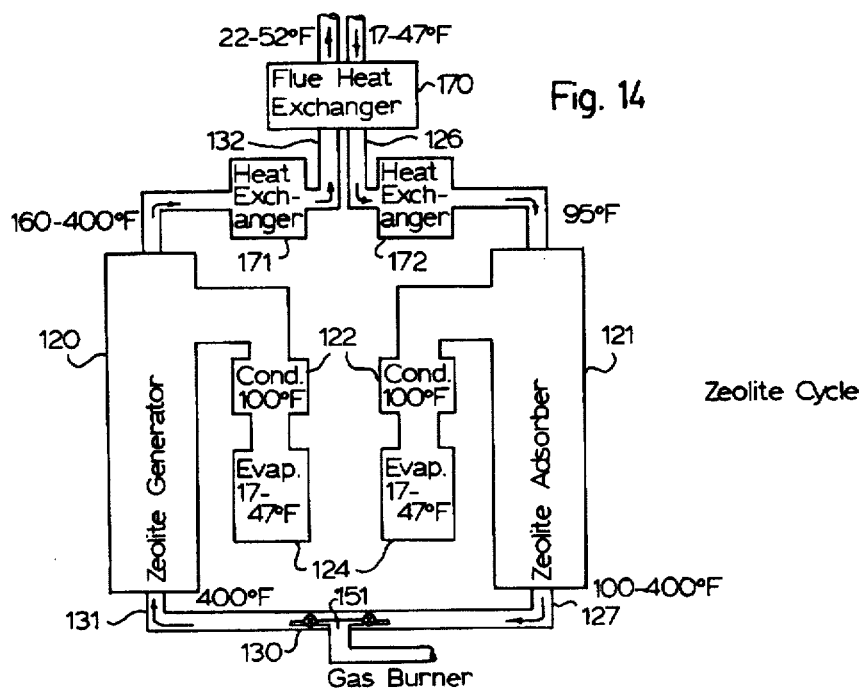
FIG. 14 is a schematic similar to FIG. 3 of a further zeolite cycle in accordance with the invention for the heating mode.

The heat exchange fluid from converter 120 exits through the outlet conduit 132 considerably cooled due to the heat exchange which takes place in converter 120. During the heating season, as indicated in FIG. 14, the heat exchange fluid may be further cooled by additional heat exchange means 172 to about 100° F. (38° C.).

After the above portion of the cycle is completed, the process, the flow of heat exchange fluid, is reversed. Outlet conduits 127 and 132 become inlet conduits whereas inlet conduits 126 and 131 become outlet conduits and the direction of flow through the heating station 130 is reversed. Converter 120 becomes the adsorber and converter 121 becomes the generator of the refrigerant gas. The remainder of the cycle is a repetition of the above described cycle with the condenser 122 in converter 121 heating and the evaporator 124 in converter 120 cooling. Thus, one adsorber is supplying heat and one adsorber supplying cooling at all times, and the duties alternate with the reversal of heat exchange fluid flow.

Figure 4:
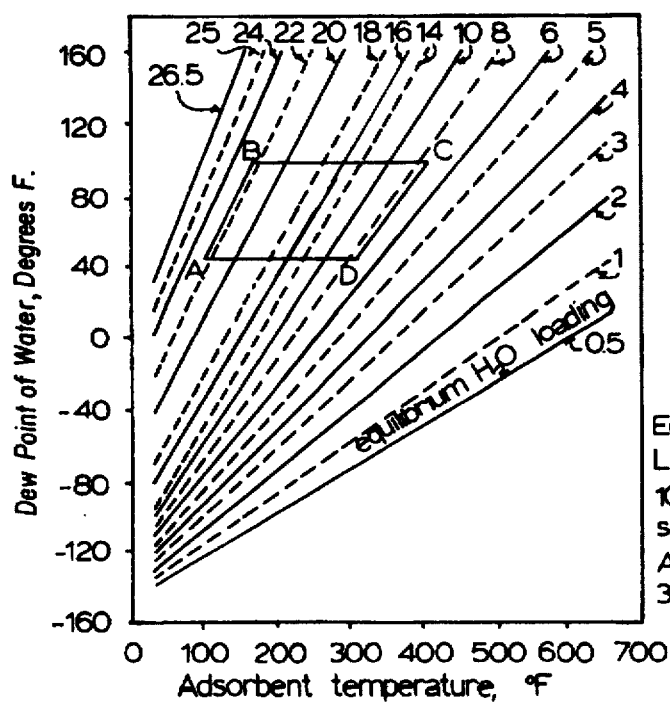
FIG. 4 is a diagram which discloses equilibrium loading of water as to pounds of adsorbed water in 100 pounds of activated zeolite molecular sieve, type Linde 13X, showing specifically the cycle of desorption and adsorption of water vapor in the instant invention.

FIG. 4 discloses typical adsorption isosteres for zeolite and water vapor. Isosteres are lines of constant loading of the refrigerant gas (water vapor) into the zeolite as a function of the zeolite's temperature and the refrigerant gases' dew point. At 100° F. (38° C.) zeolite temperature and 47° F. (8° C.) refrigerant temperature indicated by point A, the zeolite adsorbs about twenty-three percent of its weight in water vapor. The adsorption starts with the water vapor at about nine millimeters of mercury or less. The zeolite is next heated to 160° F. (71° C.) before it is possible for the vapor to start being condensed at a 100° F. (38° C.) condenser temperature. This is represented by point B. The gas pressure in the system is raised to about fifty millimeters of mercury or higher by the heating of the gas before it commences to condense. From 160° F. to 400° F. (71° to 205° C.), as represented by point C, the zeolite desorbs from twenty-three percent to eight percent, or a total of fifteen percent by weight, of its refrigerant vapor which is condensed at the 100° F. (38° C.). The Zeolite next cools from 400° F. to 305° F. (205° C. to 151° C.) (point D). This reduces the pressure of the refrigerant gas in the converter to about nine millimeters of mercury or less and upon further cooling from 305° F. (151° C.) to 100° F. (38° C.), the latter represented by point A, the refrigerant gas is evaporated from the evaporator 124 at 47° F. (8° C.) and the zeolite in the converter adsorbs fifteen percent by weight of the refrigerant gas whereupon its percentage of water vapor by weight is increased from eight percent to twenty-three percent. The cycle is thus completed. From this diagram, it will be understood that heat exchange between converters, one in the generator mode and the other in the adsorber mode, takes place in the range of 160° F. to 305° F. (71° to 151° C.) at the minimum.

The specific heat of the zeolite given in BTUs per pound degree Fahrenheit varies from 0.3 and 0.1 depending upon the amount of vapor desorbed. The heat of adsorption varies from 1200 to 1500 BTUs $1.3 \times 10^6$ to $1.4 \times 10^6$ joules) per pound and the desorption rate is about 0.0625 percent for each degree Fahrenheit. This provides a desorption contribution so that the specific heat plus desorption remains almost constant and at about one BTU per pound for each degree Fahrenheit of temperature change. Therefore at a constant rate of heat input, the rise in temperature with time without desorption, from 100° F. to 160° F. (38° C. to 71° C.) is over three times faster than when desorption is taking place from 160° F. to 400° F. (71° C. to 205° C.). Similarly, during the cooling part of the cycle, the cooling rate provides a constant heat loss of up to five times more rapid without adsorption being present from 500° F. to 305° F. (60° C. to 151° C.) than when the adsorption is occurring from 305° F. to 100° F. (151° C. to 38° C.).

Figure 5:
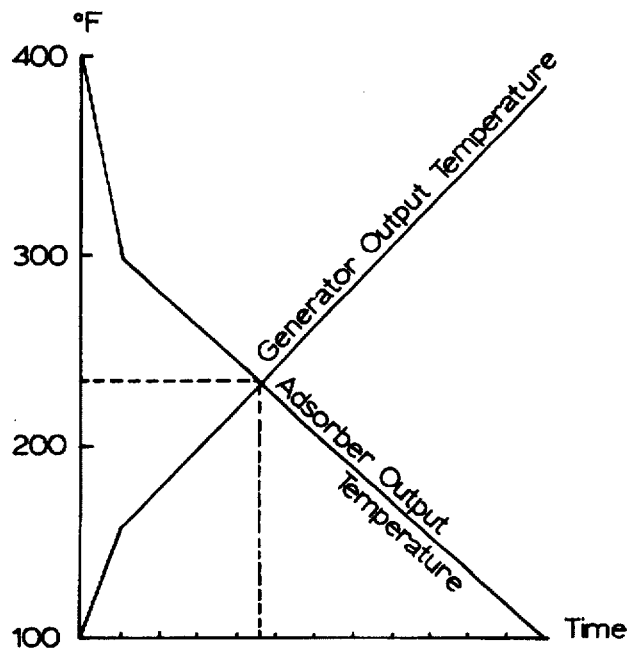
FIG. 5 is a diagram which illustrates the temperature-time profile of a conventional zeolite heat exchanger.
Figure 6:
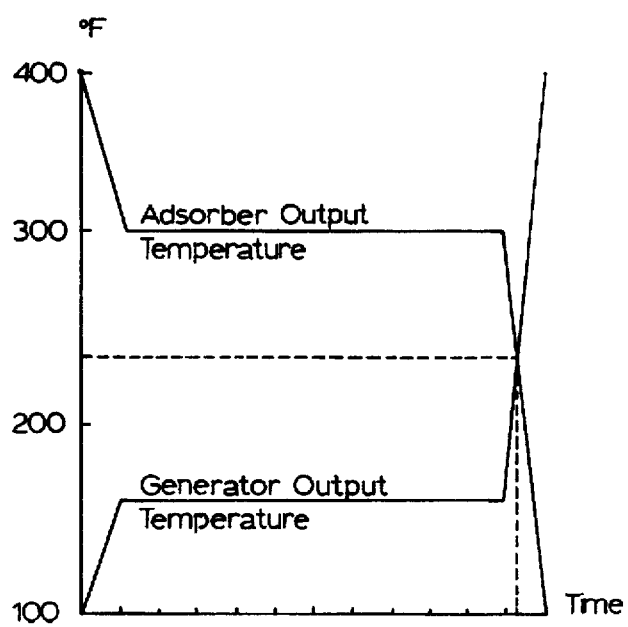
FIG. 6 is a diagram which illustrates the temperature-time profile of the zeolite heat exchanger system in accordance with the instant invention.

FIG. 5 shows the theoretical temperature-time profile for the zeolite of the zeolite containers. Assuming all of the zeolite in the converters was at the same temperature and simultaneously followed the temperature profiles of FIG. 4, 37.5 percent of the adsorber energy is transferred from the converter in the adsorber mode to the converter in the generator mode before the two temperatures cross at about 240° F. (115° C.). Allowing for twenty percent irreversible losses in the heat exchanger, a net energy transfer of over thirty percent can be provided. Inasmuch as the coefficient of performance on this cycle in cooling without the energy transfer is about 0.7, a thirty percent reduction of input requirements increases the cooling coefficient of performance to one and the heating coefficient of performance to two. Because there is a time and temperature lag between the heat input and equalization of temperature in the actual zeolite container, the increase of coefficient of performance is, in fact, higher. Further, by designing the heat transfer conduit so that a heat front is propagated through the zeolite of the converter, the improvement is considerably enhanced. The theoretical temperatures for such system employing a heat front are illustrated in FIG. 6. However, the actual temperatures attained conform more nearly to those temperature-time profiles indicated in FIG. 16.

Referring to FIGS. 9 through 13, it will be seen converters 120 and 121 can be placed in a single cylindrical container 134 which is suitably insulated and has an insulated divider 135. Fluid conduits 125 for the passage of heat transfer fluid are intentionally formed from a thin metal of low thermal conductivity. Received on each conduit 125 is a tile or pack 136 comprising a thin layer of zeolite enclosed in a high thermal conductivity material such as copper foil. Each packet 136 has the form of a flattened toroid only a few millimeters thick, which on its bottom is provided with a plurality of outwardly extending protrusions 137 or dimples and on its top side as shown in FIG. 13, a plurality of openings 140. The purpose of protrusions 137 or dimples is to provide spacing and resilience between individual packets 136. The hole 141 in packet 136 is dimensioned so as to fit tightly on conduit 125 to maximize thermal conduction between conduit 125 and the copper portion of packet 136 which contains a thin layer of zeolite, so heat which is delivered by the heat transfer fluid travelling through conduit 125 is quickly conducted to the zeolite in packet 136 via the surrounding copper foil. For example, the packets 136 can be installed on conduits 125 after the latter have had their temperature reduced so that upon expanding, a tight fit is accomplished. If desired, conduits 125 can be threaded to provide alternating thin and thicker grooves along their outer peripheries which are received tightly by corresponding grooves on the interior periphery of packet 136 defining 141.

The purpose of the foregoing structure is to create a propagating temperature front in the zeolite along each of the conduits 125. Thus the heat exchanger which comprises conduits 125 in each converter 120 and 121 has a plurality of nesting and contacting packets 136 from top to bottom and its heat transfer coefficient from the heat transfer fluid to the zeolite is larger than the conductivity along the path of the heat transfer fluid, the thermal conductivity along the conduit 125 being relatively low. The specific heat of the heat transfer fluid is also relatively low compared to the heat capacity of the zeolite augmented by desorption. As a result, a temperature front is created in the zeolite layer. The temperature front moves slowly along the length of the conduit 125 whereby in the generating converter the bottom zeolite packets are desorbed first and the corresponding layers of packets 136 which have been desorbed moves upwardly in the direction of the heat flow. Similarly, in the adsorbing converter a front in adsorbing packets 136 will move, again in the direction of the heat transfer fluid flow, downwardly. With such heat exchange, the output temperature profile over time for the converters when in the generator mode and the adsorber mode is shown in FIG. 6. In this manner, more than sixty percent of the thermal energy from the adsorber can be exchanged and the coefficient of performance of the system approaches that of theoretical Carnot efficiency.

The solution to the heat diffusion equation for the metal-zeolite innerface and in the zeolite thereafter is represented by the following equation:

$$T(x,t) = T_o \, erfc(X/\sqrt{Kt})$$

The coefficient K represents a number of physical constants such as the thermal conductivity of the zeolite, its specific heat and, above 150° F. (65° C.), the heat of desorption of the refrigerant gas. From FIG. 7, which represents the variation of zeolite temperature with time for different zeolite thicknesses, X=0.1 to 1 mm, it will be understood that there is an upper limit of the zeolite layer's thickness. The zeolite layer thickness can range from about 3 to about 17 mm with a preferred thickness of less than about 6 mm. By use of low conductivity metal for the conduit 125, ninety percent Copper, ten percent Nickel alloy, and wall thicknesses of less than five mils. The prerequisites for the creation and propagation of a temperature front as discussed above exists. This temperature front is not, of course, in practice a straight line or plane but rather involves the thickness of several zeolite packets. A more desirable or sharper temperature front is provided when the heat transfer fluid is a liquid rather than gas.

Due to the non-linearity of the adsorption isotherms for zeolite, condenser temperatures may, if desired, be increased without causing a reduction in the capacity of the unit more than would exist were conventional adsorption or absorption systems utilized and, in fact, the reduction in capacity is less. Inasmuch as in the heating mode, there is a considerable amount of energy available in the converter in the adsorber mode at 160° F. (71° C.) and below, it is advantageous to keep the condenser at about 100° F. (38° C.) and use it to preheat the load fluid with a further increase in its temperature to about 160° F. (71° C.) by heat from the converter in the adsorber mode. When cooling, the condenser is cooled indirectly by ambient air or in a heat sink or the like, and the variation with air temperature of capacity is small.

As previously indicated, specific embodiments for the invention can be varied considerably depending upon the heating and cooling demands which are placed on the system. An embodiment is shown in FIG. 9 wherein the converters are in a single unit which can be installed in an existing building and connected with an existing system in lieu of the furnace or air conditioner already installed. The container 134 for the units 120 and 121 is essentially an insulated tank having a structural capacity for a high interior vacuum which, in an operation wherein the refrigerant is water, may be five millimeters of mercury or less.

The container 134 contains two energy converters 120 and 121, each energy converter having, in effect, three heat exchange means which comprise the fluid conduits 125, the condenser 122 and the evaporator 124. Although each heat exchange means is shown as having a single pass, it will be appreciated they may be double pass or more. Also the heat exchangers are shown as having straight tubes whereby, in practice, helical wound tubes may be utilized or plate type heat exchangers may be substituted. Further, as disclosed in my co-pending application Ser. No. 267,074 filed May 26, 1981, the disclosure of which is hereby incorporated by reference, the same heat exchanger may be utilized for both the condenser and evaporator. As a matter of practice, double pass heat exchangers are advantageous for the condenser and evaporator because they permit connections into container 134 only on one side. Further, although a divider 135 divides container 134 into two different hermetically sealed spaces 133 wherein the refrigerant is received it will be appreciated that a divider may also be utilized to provide any number of such spaces which are pie shaped as seen in plan. Thus, a single container 134 may be used for three converters, four converters or, within structural limits, any number desired.

When single pass units are involved, they may be inclined within container 134 as suggested by the disposition of parts in FIG. 8 so that if a pump is not operable to provide forced circulation of the cooling and heating water flowing through the condenser or evaporator, it can occur in any event due to natural circulation of the system. Otherwise, ice may form in the evaporator or steam may be generated in the condenser.

Flue and bottom conduits 126, 127, 131 and 132 for the air and combustion gases are each connected with their respective internal conduits 125 via an atrium 142 (FIG. 9). It will be understood such flue and bottom conduits and atriums together with the fluid conduits 125 are hermetically sealed from the space 133 within container 134 which contains the zeolite packets 136 and the refrigerant which, in the preferred embodiment, is water vapor. A barrier 144 is provided in each converter 120 and 121 to divide the zeolite and conduits 125 from the condenser 122 and evaporator 124. Such barrier has a pocket formed on each side thereof whereby the condensed water is received, the pocket surrounding the cooling water tubes 146 of evaporator 124. Each condenser and evaporator is provided with such heat exchange tubes 146 which connect on the inboard side of further atriums 145 which on their outboard sides are provided with connections 147 to receive heating or cooling heat transfer fluid, as appropriate to provide heating or cooling.

Separate from container 134 is a heating station 130 which is preferably an insulated box-shaped combustion chamber 150 into which is inserted heating means comprising a gas burner 151. As previously described, gas burner 151 can, if desired, be a fuel oil burner, an engine exhaust outlet or a heat exchanger from, for example, a solar heating unit or a geothermal fluid source. Station 130 has two outlets 131a and 127a for connection to bottom conduits 131 and 127 respectively as seen, for example in FIG. 3.

Burner 151 is provided with, of course, conventional safety devices including a pilot light and a solenoid cut-off valve in the event of failure of gas pressure whereby the pilot light is extinguished. Further, burner 151 may be utilized by being directed either towards outlet 131a or 127a to include air movement through the air and combustion gases conduits when air is the heat transfer fluid. However, preferably the direction of air movement is accomplished by energizing one of two electrically driven fans 152 which respectively connected with conduits 132 and 126. By this means, air is drawn through the fluid passageways and in the event any of the conduits for the air and combustion gases leak, then the leakage is from rather than into the area wherein the system is located. A single reversible fan may be utilized on either one of the conduits 132 and 126 in lieu of two fans 152. In this connection, it should be understood the flow of air whether caused by one fan or two fans is preferably about thirty times that required to sustain combustion of fuel from gas burner 151. Thus the chances of such combustion posing a danger to the occupants of a building wherein the system is installed is practically nonexistent.

Referring again to FIG. 8 a simplified system for heating and cooling by means of the above described operation is shown. Circulating pumps 154 and 155 are employed in water conduit circuits 156 and 157 respectively.

Circuit 156 contains one or more heating elements 160 and circuit 157 contains one or more cooling elements 161. A thermal-dissipation element 162 is contained in a conduit circuit 164 which can be connected selectively to either circuit 156 or circuit 157 so that either part or all of the circulating water destined for either heat element 160 or cooling element 161 can be dissipated to the outside or to a heat sink or the like.

Valves 165 immediately after connections 147 in circuits 156 and 157 may be solenoid valves or pressure operated valves which are controlled by temperature sensors at conduits 126, 127, 131 and 132 or by pressure sensors internal to converters 120 and 121. Fans 152 are controlled by the controls for burner 151 and the particular fan to be running at any given part of the cycle is controlled by temperature sensors located in outlets 126, 127, 131 and 132 or alternatively by internal temperature or pressures sensors in converters 120 and 121.

Burner 151 may be controlled simply by a room thermostat which contains or is responsive to elements 160 and 161. It may also be connected to sensors at outlet 126, 127, 131 and 132 whereby, with the thermostat opened, the cycle is nevertheless continued until the adsorber output temperature crosses with the generator output temperature as shown in FIG. 6.

Sensors as indicated above may also be employed to dictate, when the system is started which fan will start first by detecting which converter has the highest temperature.

In operation, when converter 120 is heated, refrigerant gas is expelled from the zeolite therein and condensed by condenser 122 which thereby heats the water circulated by pump 154 in circuit 156. Fan 152 for conduit 132 draws air through passageways 125, such air being preheated at station 130 by burner 151. A heat front is created in the zeolite packets 136 starting at the bottom and working towards the top in successive packets which are received around the conduits 125 and when such front reaches its highest point whereby the zeolite in converter 120 has desorbed all but eight percent by weight of its water, the temperature in conduit 132 increases quickly to 400° F. (205° C.) thereby causing fan 152 in circuit 132 to cease operating and fan 152 in circuit 126 to commence drawing air into conduit 132 through conduits 125 in converter 120 and out of such converter via conduit 131 into combustion chamber 150.

There it is heated by the flame from burner 151 and, as heated, continues through conduit 127 into passageways 125 of converter 121 and out of conduit 126. After passing through fan 152 it is exhausted the into atmosphere. The same part of the cycle previously described for converter 120 now takes place in converter 121 and air being drawn through converter 120 cools the zeolite therein by a cold front which moves downwardly. The vapor condensed into water by condenser 122 commences to boil and is evaporated in evaporator 124 into space 133 because, as the temperature of the zeolite is lowered, it commences to adsorb water vapor and also because the pressure in converter 120 is lowered. This evaporation in evaporator 124 at the lower temperature takes place at about 8° C. or 47° F. However, the adsorption of the water vapor into the zeolite heats the zeolite by means of the heat of adsorption.

The heat of adsorption together with the heat source provided by the higher temperature of the zeolite and other internal structure heats the air passing through the conduits 125 while, at the same time, cooling the zeolite and other structure. A thermal front drops through the zeolite as previously described and the heated air is transferred via conduit 131 to combustion chamber 150 thus preheating and preserving the heat of adsorption as well as that due to the specific heat of other elements in the converter 120. The ultimate result is a much higher coefficient of performance than would otherwise be obtainable. During this part of the cycle, cooling water is caused by pump 155 to circulated through circuit 157 and such cooled water may be utilized for cooling purposes in the cooling season or for other cooling purposes (for example, cooling a food storage room) or dissipated as required. Because of the possibility that the temperature in the evaporator 124 may drop below freezing during the heating season, such water may have antifreeze or the like added thereto to ensure it is not frozen.

FIG. 14 is a diagram similar to FIG. 3 which is, however, a more complete representation of the zeolite gas-fired pump in the heating mode. In addition, an indication of typical temperature to be experienced during heating operations is set forth in FIG. 14. Combustion air enters from the outside into the conduit 126 at a temperature which in the heating season is typically between 17° F. or 47° F. (−8° C to 8° C.). This air is preheated by a flue-heat exchanger 170 to about 95° F. (35° C.). Such heat exchangers are well known in the art and therefore will not be described in detail. An example is the Dolin Heat Reclaimer manufactured by Stacor Corporation of Newark, N.J. Such air passes through a further heat exchanger 172 which, for the part of the cycle indicated in the Figure, is inactive. The combustion air continues into the converter 121, passing through the conduits 125. The generator 121 is in the adsorber phase and is being cooled from its prior generator phase during which it reached 400° F. (205° C.) Converter 121 slowly cools and continuously adsorbs refrigerant vapor from its evaporator 125 at a temperature which is typically, again, between 17° F. and 47° F. (−8° C. to 8° C.). The generated heat of adsorption plus the specific heat of the zeolite and other container structure heat the outside combustion air (heat transfer fluid) flowing through conduits 125 to between 100° F. (38° C.) and 400° F. (205° C.). With the air to zeolite heat exchanger comprising packets 136 stacked on conduits 125, the output temperature of the air and combustion gases from conduits 125 is maintained at about 400° F. (205° C.) for almost the entire adsorption part of the cycle.

By thermostatic or other appropriate well-known controls, the combustion air leaving converter 121 via conduit 127 is heated at heating station 130 to about 400° F. Such air is then conveyed by conduit 131 into the converter 120 wherein the zeolite is about 95° F. (35° C.) which it reached in its prior adsorber phase. Now with converter 120 in the generator phase, the temperature of the zeolite is increased via the propagating temperature front to about 400° F. (205° C.).

As soon as some of the zeolite in converter 120 is heated to above about 160° F. (71° C.), refrigerant gas is desorbed and the pressure increase is sufficient for the gas to condense at 100° F. (38° C.), the heat of condensation in the converter's condenser 122 being used to provide the heating load. Combustion gases leave converter 120 at about 160° F. (71° C.) at the beginning of the generation cycle, but their temperature increases rapidly to about 400° F. (205° C.) where it remains until the end of the cycle. During the heating season, these gases are cooled in heat exchanger 171 to about 100° F. (38° C.). Heat exchanger 172 may be utilized in conjunction with condenser 122 for the heating load or as a preheater for hot water and other heating purposes. It will, of course, be understood the entire heating load of the building may be furnished by the condenser 122 and heat exchanger 171 when converter 120 is in the generator phase. In a like manner, converter 121 may be used together with its condenser 122 and heat exchanger 172 to provide heat for the entire heating load of the building when it is in the generator phase. Thus, the fluid circulated through heat exchangers 171 and 172 which is heated for the purpose of the overall heating load is switched alternately between such heat exchangers in the same manner as accomplished for condensers 122 and evaporators 124. Finally, gases leaving heat exchanger 171, 172 are further cooled in the flue-heat exchanger 170 and exhausted to the outside air in a temperature range which is typically in the range of 22° F. to 52° F. (−6° C. to 11° C.). Heat carried away from the evaporators 124 is typically dissipated in element 162. It is not, however, unusual for larger buildings to require both heating and air conditioning at the same time due to the location of the sun and other factors. Thus it is possible by using the instant invention with an appropriate plumbing arrangement both to heat and cool simultaneously.

After the described portion of the cycle is completed, the process is reversed and the direction of air flow through the heating station 130 is also reversed. The cycle is repeated as described above with condensers and evaporators also being interchanged.

The coefficient of performance of the heat pump described above and disclosed in FIG. 14 is theoretically about three for the heating mode where the evaporator temperature is 17° F. (−8° C.) and the condenser temperature is 100° F. (38° C.) for a load of 160° F. (71° C.). In practice, of course, the coefficient of performance is less. But with proper design is nevertheless within about eighty percent of the theoretical value, that is, about 2.4.

The time of each cycle depends upon the size of the unit. With the proper design, in theory it could be short as two and one-half minutes. However, to ensure that the materials, particularly conduits 125, are sufficiently strong and durable, as a matter of practice, the cycling time is fifteen to thirty minutes. With the zeolite temperature range being from 100° F. to 400° F. (38° C. to 205° C.), it desorbs about fifteen percent by weight of water vapor and each pound of zeolite produces about 150 BTUs ($1.6 \times 10^5$ joules) of cooling when the 0.15 pounds of water is condensed and evaporated during a cycle. Thus with fifteen minute cycling, 600 BTUs ($6.3 \times 10^6$ joules) per hour of cooling are provided per pound of zeolite. For one ton of air conditioning, that is, 12,000 BTUs ($1.3 \times 10^7$ joules) per hour, twenty pounds of zeolite are therefore necessary.

It is advantageous that the zeolite in packets 136 be composed of thin slices of natural deposit zeolite which are only a few millimeters thick. Each zeolite slice is then inserted into a corresponding packet 136 made of thin copper foil. When the surrounding packet 136 is then evacuated, the copper foil is brought into close contact with the zeolite slice to provide a good thermal conduction for the thermal cycling without a need for binders.

The end product, which is essentially the container 134 with the converters 120 and 121 installed together with the combustion chamber 150 and gas burner 151, is an adsorbent heat pump having a cooling coefficient of performance of between one and two and a heating coefficient of performance between two and three. The weight of the unit is somewhat less than eighty pounds for each ton of cooling and its price is competitive with or less than that of existing electrically driven heat pumps for each ton of cooling. For most areas, the operating costs are significantly less. Moreover, both in initial cost and in operating and maintenance costs for the unit is substantially less than the combination of electrical air conditioning and a gas furnace. This advantage is expected to continue even if an increase in gas prices occurs to the extent that the heating and cooling costs for a building will be reduced despite the increased gas prices. The system is particularly attractive for the central and northeastern parts of the United States where annual heating costs of over $1,000 are sufficient to justify the replacement of existing systems with a repayment period of about two years without considering tax credits.

It will be noted the system does not utilize inside air for combustion as is frequently the case with conventional gas furnaces. Although the circulation of air may occur or be provided by other means including diffusion and intentional circulation of interior air to the outside and vice versa, the inevitable loss due to the forced infusion of air which results from a conventional furnace is thus eliminated by the invention.

Figure 15:
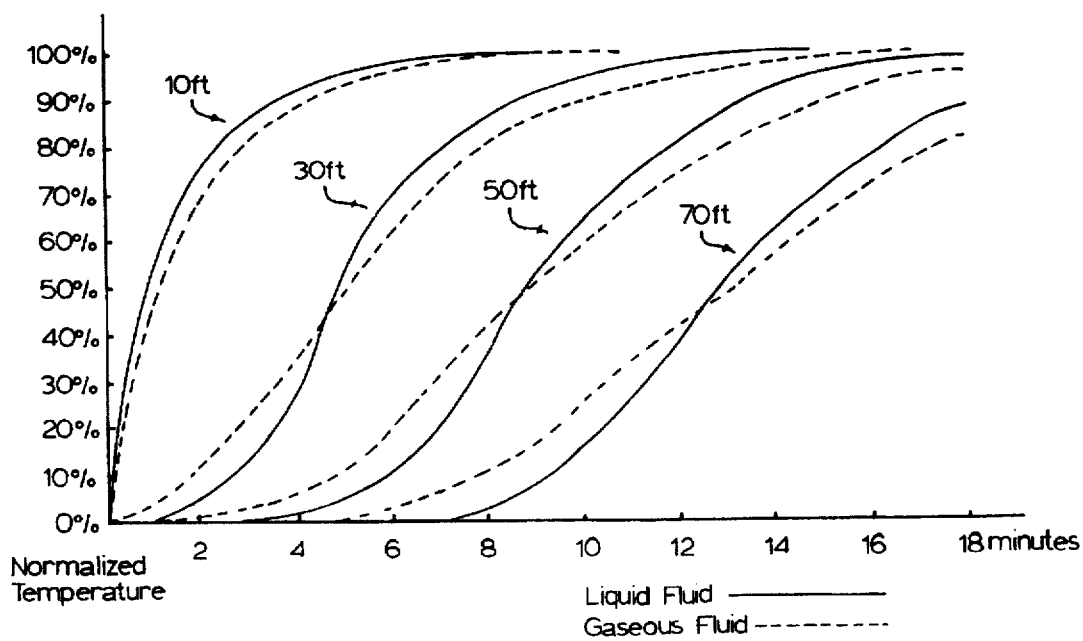
FIG. 15 shows the actual output temperature of a heat exchanger with time for different lengths of heat exchanger.
Figure 16:
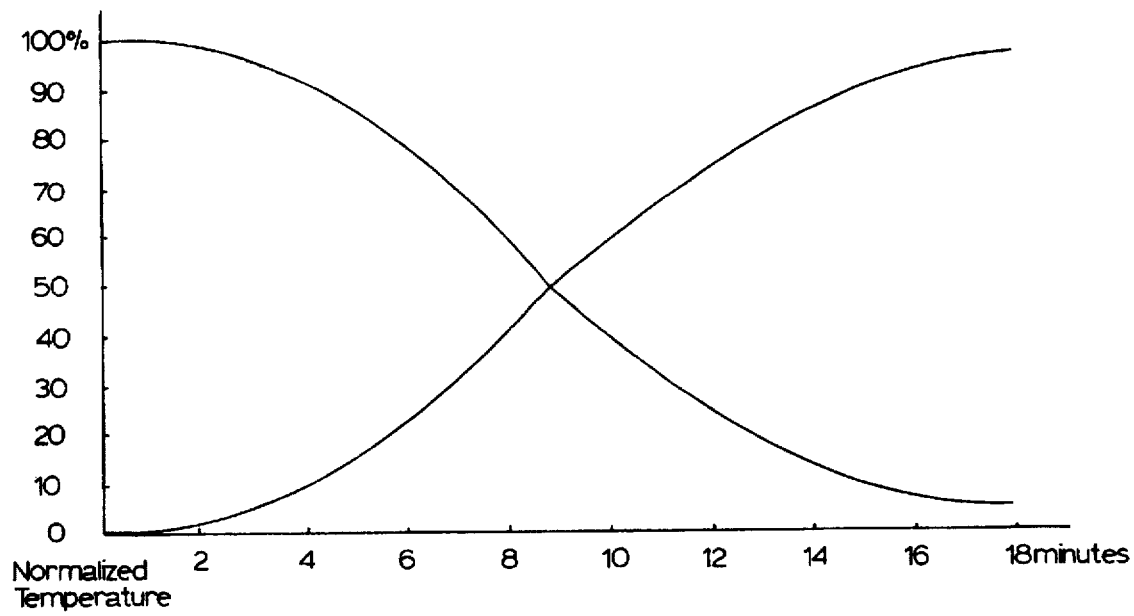
FIG. 16 is similar to FIGS. 5 and 6 showing actual performance wherein 70 percent energy is cycled between two containers.

In FIG. 15 various lengths of heat exchangers are compared to show the temperature increase which occurs for various effective lengths of the heat exchangers in terms of time. It will be noted that the shorter the heat exchanger, the more rapidly the temperature rises. FIG. 15 together with FIG. 16 are important for the purpose of showing the actual efficiency of energy recycled between the two containers. Thus FIG. 16 discloses the reduction of temperature in one of the containers while the temperature in the other container is increasing. FIG. 16 together with FIG. 15 indicate a seventy percent recycling of energy between the two container. In generating the data shown in these figures, the normalized temperatures for gas were 100° F., 400° F. (33° C. to 205° C.) for the gaseous fluids and 25° C. for the liquid fluid.

Figure 17:
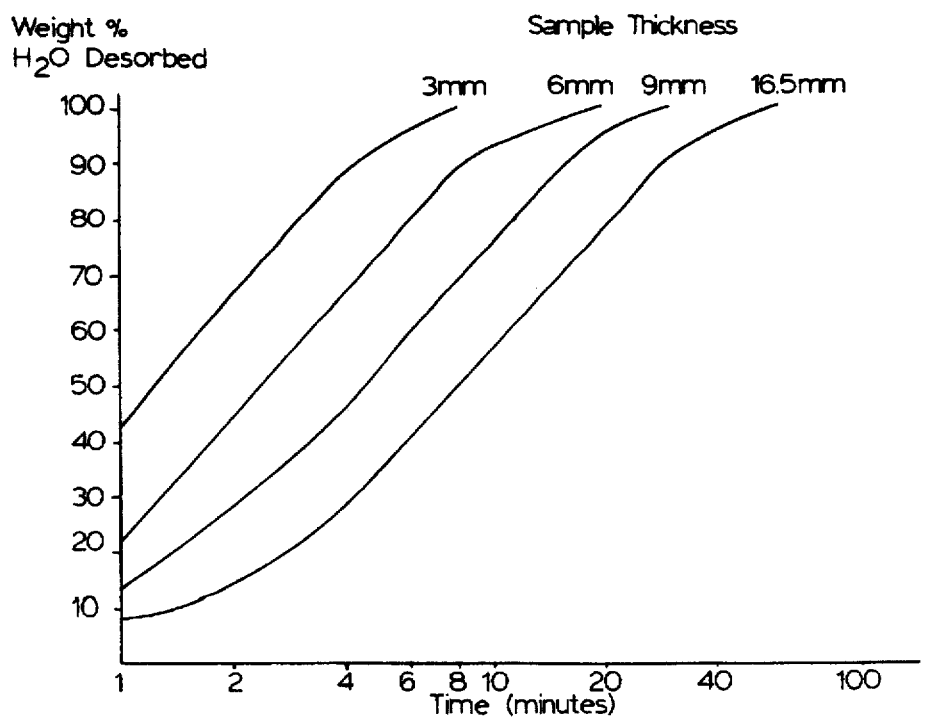
FIG. 17 is a graph showing measured performance of zeolite in desorbing water vapor for different thicknesses of zeolite.

FIG. 17 discloses the measured performance of different thicknesses of zeolite when immersed initially in a well-stirred liquid bath with a temperature differential of 100° C. Thicknesses ranging from three millimeters to 16.5 millimeters were tested. Such results indicate that a cycling time of three to four times per hour is not only feasible but also can be achieved with zeolite samples in thicknesses up to one-quarter inch thick or about six millimeters. However, it is important that the thermal flows into and from the zeolite be from both sides of the envelope so that the effective thermal path is reduced considerably.

Figure 18:
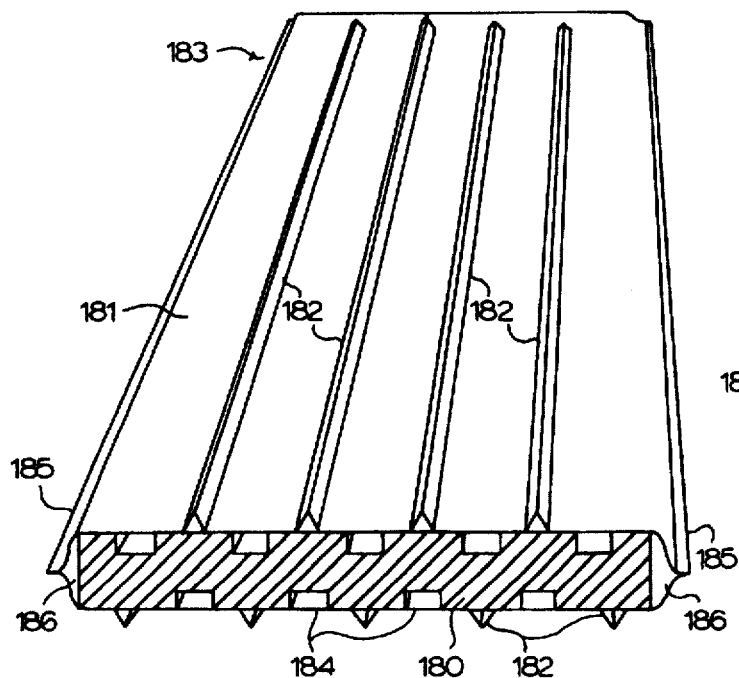
FIG. 18 is a perspective view in partial section showing zeolite bricks or tiles enclosed in a copper foil envelope as utilized to generate the data shown in FIG. 17.

A zeolite heat exchanger unit 183 found advantageous is shown in FIG. 18. This may be substituted for packets 136 and conduits 125 as shown in FIG. 9 with channels 182 and 184 being in fluid passage communication with the hermetically sealed space 133 through which refrigerant flows. This type of envelope was utilized for the test which produced the results shown in FIG. 17. Zeolite bricks 180 are enclosed in a copper foil envelope 181 which includes a plurality of fins 182 which also form corrugated channels in the copper foil. The zeolite 180 also has a plurality of channels 184 and water vapor or other fluid flows readily through channels 182 and 184. Flue gases flow around foils 181. Foils 181 are sealed around their edges 185, such seal forming a further fin and on the inside a further channel 186.

Figure 20:
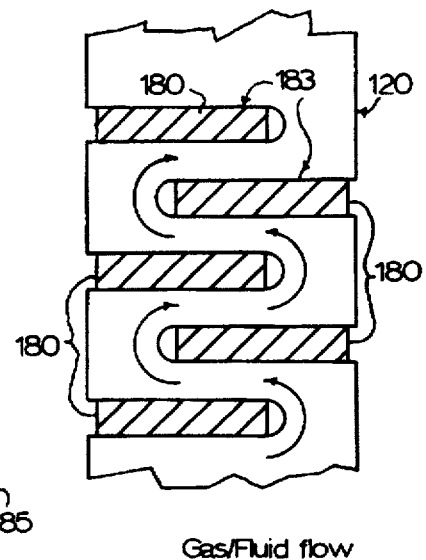
FIG. 20 is similar to FIG. 19 except that it discloses the zeolite envelopes in series for the gas/fluid flow.
Figure 19:
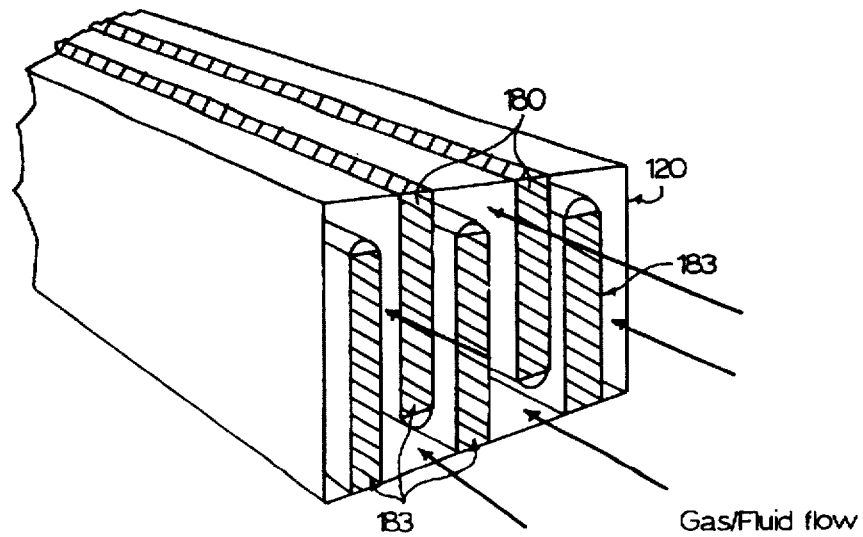
FIG. 19 illustrates the gas/fluid flow around a copper flow envelope as shown in FIG. 18 wherein the envelopes are in parallel.

The zeolite heat exchanger means 120 and 121 may thus be constructed of a number of units 183 either in parallel as illustrated in FIG. 19 or in series as illustrated in FIG. 20. The final configuration is determined by the size and capacity of the cooling unit. Typically, a one ton cooling capacity unit having twenty pounds of zeolite is cycled four times per hour between 100° F. and 400° F. (38° C. to 205° C.) and heat exchanger units 183 consist of three millimeter zeolite bricks 180 in thin copper envelopes. For maximum heat exchange effectiveness this produces a packing density of heat exchanger 120 of about 0.5 pounds of zeolite per square foot of heat exchanger. Therefore the total area of the heat exchanger is forty square feet which may be divided between the two containers 120. Air flow velocity for the gaseous heat transfer fluid is ten feet per second which provides a heat transfer coefficient to the copper envelope of 3 BTU/sq.ft/hr.° F. To increase this coefficient, as indicated, the copper foil is provided with corrugated channels 182 which act as fins to increase the surface area of the heat exchange and simultaneously to function as channels through which the water vapor travels.

As shown in FIG. 18, the zeolite brick 180 is provided with channels 184 for vapor travel. This, however, reduces the contact area between the zeolite and the copper and therefore the heat flow to a certain degree.

Zeolite bricks 180, as such, have been prepared by two separate methods. The first is by slicing natural zeolite rock with a carbide saw. A second method is by pressing powdered zeolite in a die. In the pressing, zeolite powder is slightly wetted with water and then pressed to the desired configuration at pressures of up to about one hundred, forty kilograms per square centimeter to produce a brick which dry has a density of about 0.8 grams per cubic centimeter. It has been found that these measures are required to produce high thermal conductivity and heat flow in the zeolite and therefore are important for a successful system. Zeolite bricks 180 are preferably not more than about ten millimeters in thickness.

With laminar flow of oils, the Biot number is less than that with any flow of gases. Further, calculations predict a sharper temperature front and therefore eventually a higher system efficiency with a liquid flow vis-a-vis gaseous flow. These calculations have been confirmed by experimental observation of thermal front propagation.

In an embodiment using oil as the zeolite/condenser/ evaporator heat exchange fluid, water is retained as the working medium, that is the refrigerant, in preference to other refrigerants such as ammonia, alcohols and freons. Water has the highest heat of vaporization of candidate refrigerants and, in addition, is stable at 400° F. (205° C.) in zeolites. Although COP may be shown as a function of zeolite and condenser temperatures, the evaporator temperature influences COP more than the condenser temperature. Because of their non-linearity, zeolites operate in systems with air-cooled condensers without any significant loss in performance. Natural zeolites have been found superior to synthetic ones, especially at the lower temperatures (between 200° F. and 350° F. (92° C. to 175° C.)). However, their superiority reduces significantly at 400° F. (205° C.).

As indicated above, the provision of a relatively sharp temperature front in the zeolite increases the efficiency of the system and, on the basis of both theory and experiment, liquid rather than gaseous fluid provides a sharper front in the zeolite. Experiment and theory agree that with a front moving alternatively in one direction and then back in the other direction, an advantageous cost-effective length for a heat exchanger is about thirty-six feet (11 meters) inasmuch as increases in COP begin to reduce after this length. A close, but somewhat longer length of forty-three feet (13 meters) has been selected for the heat exchanger with the zeolite in the embodiment under consideration. The theoretically predicted temperature front width is about 60% of the total length for a heat exchanger length of thirty-five feet (10.7 meters). If the heat exchanger length is forty feet (12.2 meters), then the front width is 59% and for a forty-five foot (13.7 meters) length of heat exchanger it is 58%. For a thirty-six foot (11 meters) heat exchanger, about 75% of the energy can be recycled to increase the cycle COP to 2.0. If maximum COP was the only consideration, then, of course, the longer the heat exchanger, the better. However, for similar designs, the cost per unit length of heat exchangers and the cost of associated equipment also increase and because of this trade-off, about thirty-five (10.6 meters) to about sixty feet (18.3 meters) is considered optimum for the length of the liquid/zeolite heat exchanger.

The heat exchanger using a liquid fluid incorporates natural zeolite from Bowie, Ariz. that is capable of desorbing 15% by weight of water vapor which, when condensed in the evaporator, produces 12,000 BTUs ($1.3 \times 10^7$ joules) of cooling. Such zeolite which is about ¼" thick, actually six millimeters, using the thin copper material for heat exchange purposes, has a timed constant on desorption of 3.5 minutes and desorbs better than of the equilibrium water vapor in ten minutes or less. Although ¼" (6 mm) thickness is desirable because of the integrity of the zeolite, a thinner zeolite can be used if it is desired to reduce the time constant on desorption. A square foot of zeolite tile ¼" (6 mm) thick weighs about 1.3 pounds including the adsorbed water. Flat tile geometry for the zeolite is preferred inasmuch as with atmospheric pressure on one side of the copper foil against the zeolite tile which is in vacuum, good thermal contact and heat transfer from the fluid to the zeolite is ensured irrespective of the constant cycling in temperature and differences of thermal expansion coefficients between copper and zeolite.

Figure 21:
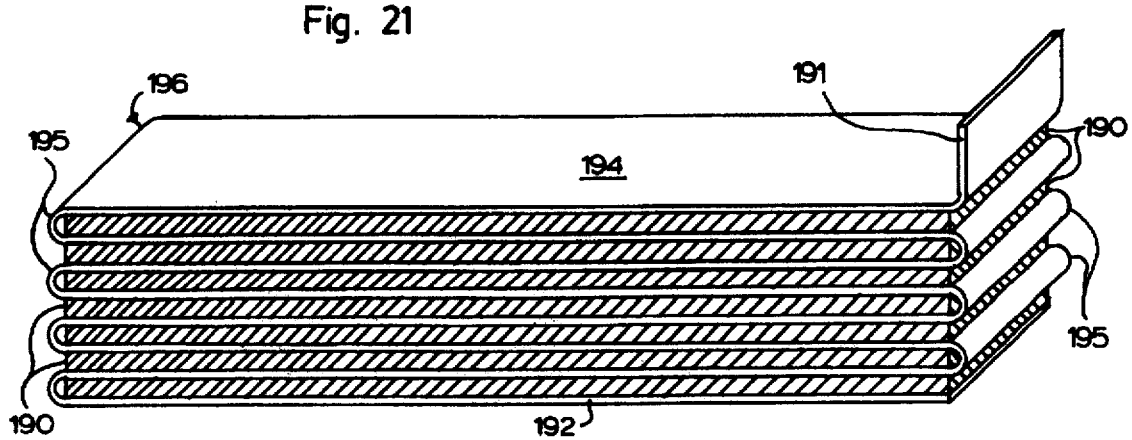
FIG. 21 illustrates a variation of a gas/fluid flow system designed particularly for liquid fluids.

For low cost and simplicity of manufacturing, the design shown in FIG. 21 has been selected. Here the copper foil duct 194, wherein the foil is about 0.35 millimeters thick within a preferred range of 0.2 to 0.5 millimeters, is folded in two and the edges 192 are welded together to form the equivalent of a flat pipe or duct 194 about one foot (30.5 cm) in width and up to about forty-five feet 13.7 meters) long. Duct 194 is formed with 180° bends 195 every foot to provide a serpentine structure with ¼" thick 12"×12" (6 mm×30.5 cm×30.5 cm) zeolite tiles between the serpentine turns from alternating sides to form a stack 196 which, because the duct 194 is about ⅛" (3 mm) in thickness, is roughly 13" wide×12" deep by 16" high (33 cm×30.5 cm.×40.6 cm).

In this embodiment the length of duct 194 is roughly forty-three feet (13 meters) inasmuch as there is one more layer of duct than zeolite tiles 190 and the turns in the duct's serpentine configuration must be accounted for. To reduce duct 194 without reducing the capacity of the zeolite tiles to adsorb and desorb water vapor preferably the depth of the duct and the zeolite tiles perpendicular to the direction of the duct should be increased and the width may be correspondingly decreased. If sufficiently increased, the capacity of stack 196 for heating and cooling is increased.

Preferably the copper foil of duct 194 is sealed at edge 192 by electron beam welding in a manner comparable to the method widely used in the copper tubing industry. Other means are, of course, known as ultrasonic welding and brazing (silver soldering).

Zeolite tiles 190 may be pressed from zeolite powder with the proper binders and lubricants. Slicing of natural rock zeolite is also known to produce operable zeolite tiles. There need not be only one tile for each layer. For example, four 6"×6" (15 cm×15 cm) tiles may be used in the place of a single one foot square (929 cm$^2$) tile. Smaller tiles have the advantage of providing additional surfaces and channels through which water vapor may be adsorbed and desorbed from the tiles. To avoid crumbling, the zeolite tile may be provided with copper frames or pressed into copper honeycomb-type cores. In addition, because the copper in duct 194, when vacuum is applied to the zeolite tiles, conforms itself to the contours of the surface which it engages, with the tiles properly shaped and disposed relative to each other at each level, grooves are formed by the vacuum applied to the zeolite tiles in the copper foil which both strengthen the duct and increase the effective foil-to-zeolite surface engagement. This can be further increased by creating channels in the zeolite tiles 190 when they are pressed or by providing grooves on the surfaces of natural rock zeolite. Such channels or grooves, if sufficiently deep, serve the purpose of both strengthening the adjacent engaging copper foil and enhancing vapor transport from and to the tile. Moreover, because the grooves, however formed, are only in the transverse parallel flat portions of the copper foil, the portions comprising bends 195 are not affected. The forming of bends 195, in manufacture, without collapsing when the 180° bends are formed, is accomplished by filling duct 195 with Cerobend alloy which melts at 158° F. (70° C.), before bending. The bend is thereby accomplished as though a solid metal plate is involved and the alloy is subsequently melted, recovered and reused for further manufacturing operations. Alternatively, the duct may be filled with sand before bending or may be bent under hydraulic pressure and the problems involved are not greatly different than those utilized to bend copper tubing without collapsing the walls.

Using a ⅛" (3 millimeter) spacing between the top and bottom of the copper foils of duct 194 results in the volume of each heat exchanger or stack 196 being about three gallons. Because of the high viscosity of most high-temperature oils which may be used for this purpose, reducing the space between the foils to less than ⅛ of a inch (3 mm) substantially increases the pressure drop across each stack 196. With, however, the ⅛" (3 mm) spacing the pressure drop, using high-temperature oil with a maximum viscosity of five to ten centistokes, does not exceed about five psi ($3\times10^4$ pascals) across stack 196. High temperature oils practicable for the heat-exchange fluid are well within the skill of the art. An example is Therminol 60 which has a viscosity of five centistokes (cm$^2$/sec) at 100° F. (38° C.), two at 200° F. (92° C.) and an operating temperature up to 600° F. (315° C.).

Figure 22:
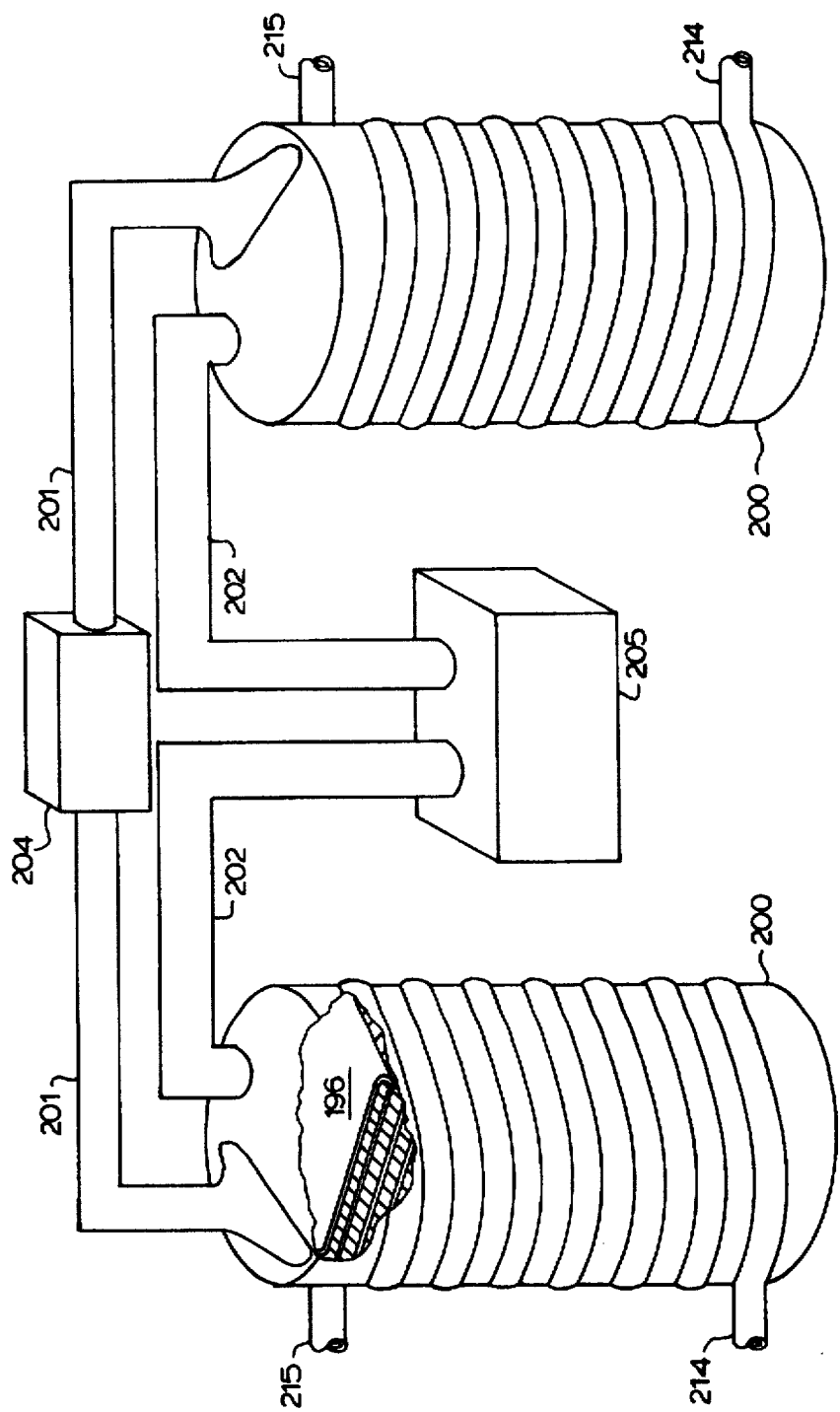
FIG. 22 is a diagrammatic representation which illustrates a system that uses a liquid for heating and cooling the zeolite.

Stack 196 is housed in an air-tight container 200. As in previous embodiments and as shown in FIG. 22, there are two containers 200, each of which has conduits 201 and 202 for a sealed flow passage to the upper channel and lower channel respectively of duct 194. Each container 200 is generally cylindrical in shape and of such size and configuration internally to restrict stack 196 in a verti-direction whereby it does not expand when air is evacuated from container 200 and it contains water vapor at low atmospheric pressure.

Conduits 201 contain a reversible pump 204 which is preferably a gear pump to ensure that the flow rate remains constant even though the viscosity of the high temperature oil which it causes to flow through conduits 201, duct 194, conduits 202, and a boiler 205, changes viscosity by almost an order of magnitude. Also, of course, it is necessary that the flow of the oil be reversed each cycle with the least complications. The gear pump involved has an operating temperature of at least 200° F. (92° C.) and is connected to a variable speed reversible motor of ⅛th or ¼th (93 or 186 joule/sec) horsepower capacity. The combination is capable of pumping up to two gallons per minute at twenty pounds per square inch pressure ($7.5\times10^{-3}$ cubic meters per minute at $1.379\times10^5$ pascals) and operating the system at an input of about 118,000 BTUs per hour ($1.25\times10^8$ joules/per hour).

Figure 23:
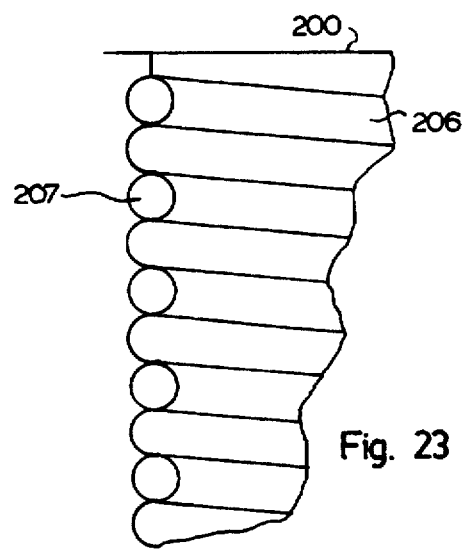
FIG. 23 is a broken cross-section of the heat exchanger cylindrical wall for the system shown in FIG. 22.

In this embodiment, each container 200 does double duty as a condenser and an evaporator by alternately cooling and heating the vertical wall of its cylindrical shape. A preferred embodiment is shown in FIG. 23 wherein the wall (which is copper) is corrugated with a continuous helical groove 206 which, in turn, receives copper tubing 207. It will be appreciated that the corrugations increase the strength of container 200.

Figure 24:
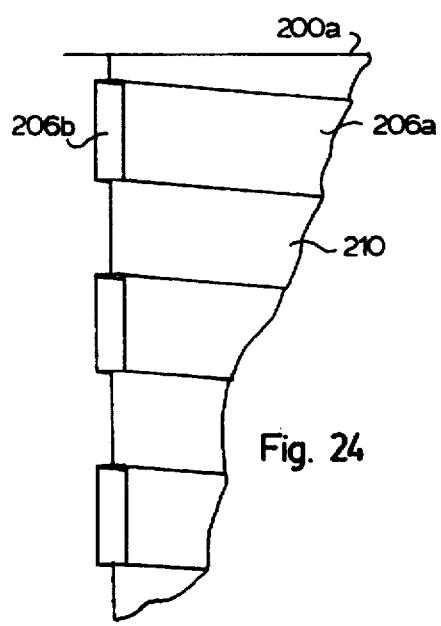
FIG. 24 is a cross-section of a further heat exchanger cylindrical wall which is an alternative to that shown in FIG. 23.

FIG. 24 illustrates an alternative arrangement. Here a container 200a, again composed of copper, is embossed with a pattern of channels 206a and a corresponding outer shell 210 is also embossed with internal channels 206b. Container 200a has shell 210 welded thereto in such a manner that the embossed channels 206a and 206b define a helical flow pattern which is used to receive the heat exchange medium. Otherwise container 200a is the same as container 200.

The purpose of boiler 205 is to increase the temperature of the oil passing therethrough to 400° F. Preferably boiler 206 is gas fired and may be any of a large number of boilers designed for this purpose. It may be heated by any known energy source for this purpose including engine exhausts, geothermal sources, and solar energy either to supply part or all of the needed thermal energy required for the system to operate.

In this embodiment, there are three hermatically sealed contiguous spaces which are isolated from each other. The innermost comprises the interior of duct 196, contiguous conduits 201 and 202 and the flow passages through pump 204 and boiler 205. Such space is completely filled with high temperature oil. The second sealed space (actually two separate spaces) is the interior of each container 200, which is exposed to the zeolite which, in turn, adsorbs and desorbs water vapor in the containers at sub-atmospheric pressures as previously discussed with reference to FIG. 4, that is, between about nine and fifty millimeters of mercury.

The third contiguous space is defined by the copper tubing 207, or the passages defined by channels 206 and 207 in container 200a, and the conduits therefrom which form the heating and cooling loops. This space is normally filled with water.

Figure 28:
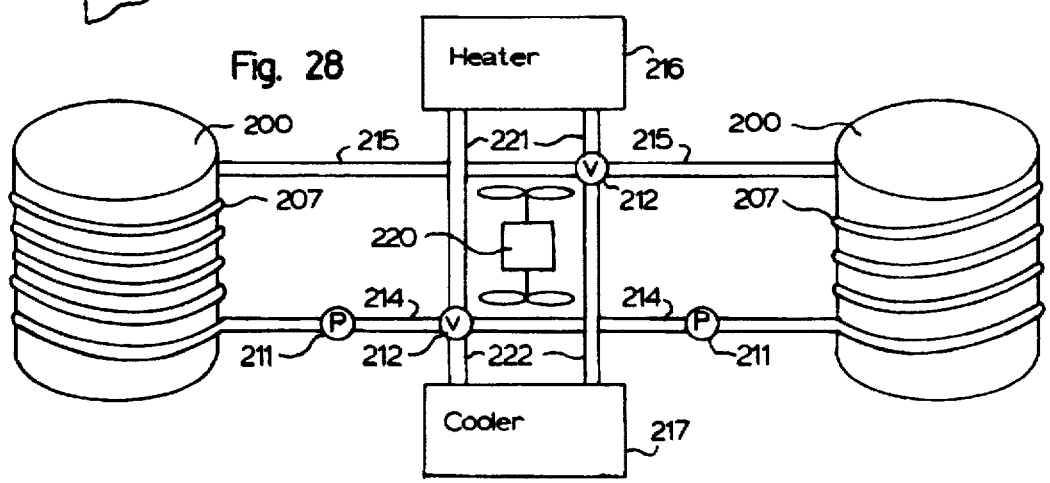
FIG. 28 is a schematic similar to FIGS. 3 and 14 which illustrates exterior water loops for the systems otherwise illustrated in FIGS. 21-27.

Referring to FIG. 28, it will be noted that the loops for exterior water include lower conduits 214 and upper conduits 215 which respectively connect on lower and upper ends of condenser/evaporator coiled tubes 207 of each container 200. Both upper conduits 215 connect to a double-channel two-way valve 212 and a similar valve 212 connects the lower conduits 214. Valves 212 are controlled by solenoids (not shown) alternatively to connect one of the containers 200, acting via its tubes 207 as a condenser, to heater 216 and the other container 200, via its tubes 207 when acting as an evaporator, to cooler 217. Heater 216 and cooler 217 contain coils for conveying the water received from conduits 214 and 215 which are subjected to air flow from fan 220 so that, depending upon whether the building space is being heated or cooled, the air is either expelled to the atmosphere or circulated in the building. With individually controlled spaces in the building, some such spaces may be heated while others are cooled and, of course, heating elements may be employed with cooler 217 for increasing the temperature of cooled air from which the condensate has been removed, and for heating domestic water. The conduits leading to heater duct in FIG. 28 are designated by reference numeral 221 and those for the cooler loop through cooler 217 are designated by reference numeral 222.

Pumps 211 have a capacity of five gallons ($1.879 \times 10^{-2}$ cubic inches) per minute and use about sixty-three watts of power. If desired, they may be reversible with the reversing of the cycle. The schematic shown in FIG. 28 is simplified and it will be appreciated that both heater 216 and cooler 217 may represent a plurality of heaters and coolers which may have various dispositions relative to the building which is heated and cooled by the system.

In operation, heated oil is drawn from boiler 205 at 400° F. (205° C.) into one of the containers 200. The heated oil enters the bottom of duct 194, heating the adjacent zeolite tiles 190 as it proceeds through duct 194. Such tiles, upon being heated, desorb water vapor which raises the pressure in container 200. This water vapor is continually condensed by the cooling effect of water circulating in tubes 207 (or channels 206b) and, on condensing, transfers its thermal energy to the water in such tubes (or channels) which is circulated to heater 216, via conduits 215 and 221, wherein the thermal energy is removed and the water returns via pump 211 to continue the condensing process together with the heating of the circulating water. Because of the heat front which exists in the ribbon of oil as it flows up the serpentine path between the zeolite tiles 190, such tiles are heated from the bottom up and during the period of the cycle, water vapor continues to be desorbed from these zeolite tiles, to be condensed by water flowing through tubes 207 (or channels 206b) and to transfer thermal energy imparted to such water to heater 216.

Figure 25:
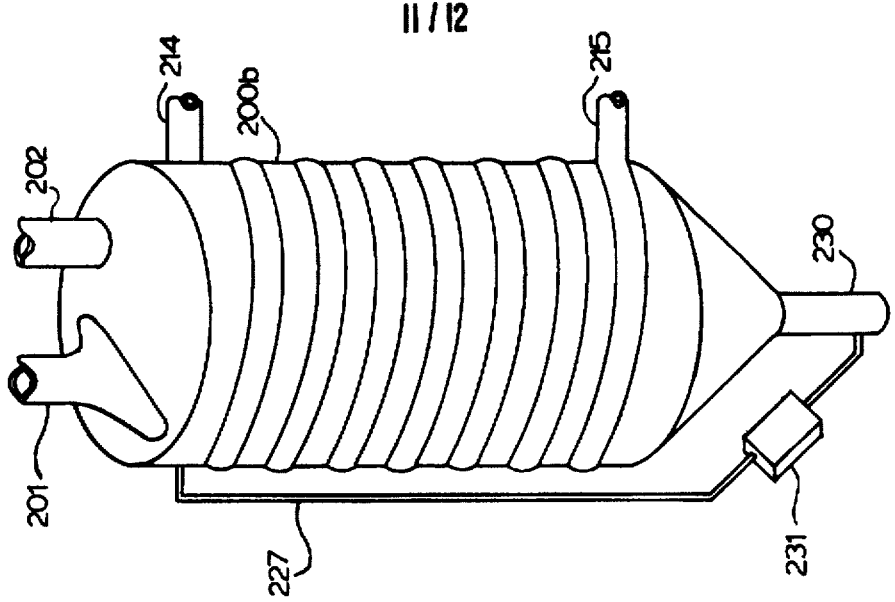
FIG. 25 shows a converter of the type illustrated in FIG. 22 in a condensate return loop.
Figure 26:
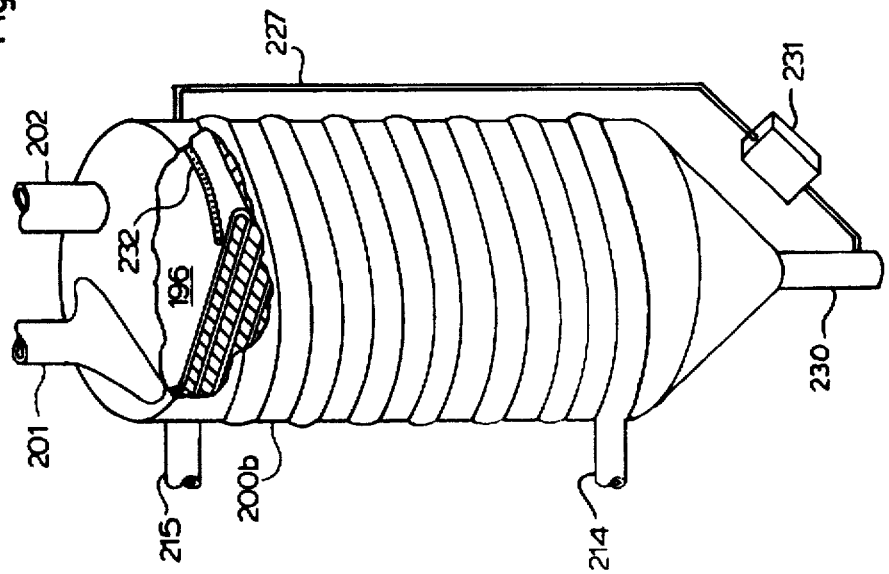
FIG. 26 discloses the other converter for a system such as shown in FIG. 22 which is cut-a-way to illustrate the heat exchanger cylinders and a ring manifold for trickle evaporation.

At the same time, pump 204 is moving oil (cooled in the previous half-cycle) into the top of the other container 200 and stack 196 therein and, more specifically, into the top of duct 194. Here the zeolite tiles, having been previously heated and activated, are now in condition to adsorb water vapor in container 200. If desired, duct 201 may be selectively divertible through a heat exchanger such as heater 216. As the zeolite tiles 190 cool, pressure in container 200 reduces, vapor being adsorbed into the zeolite, and the previously condensed water therefore commences to be evaporated taking thermal energy from water flowing through the surrounding tubes 207 (or channels 206b) which passes via conduits 214, 215, vales 212, and conduits 22 to cooler 217 where the water is warmed and recirculated back to the tubes 207 (or channels 206b) surrounding container 200. As the cooling of zeolite tiles 190 continues in a downwardly direction, the cooling effect also continues. Heat of adsorption is of course largely retained due to the heat exchange from the zeolite tiles 190 to the oil. If desired, conduits 215 may include a spiral or undiluted form portion in the bottom of container 200 for an improved heat exchange relationship. Alternatively or in conjunction therewith, a return condensate line may be provided from the bottom of each container 200b is illustrated in FIGS. 25 and 26 to enhance evaporation and adsorption in tiles 190. Here condensate in container 200b is received by gravity in sump 230. Such condensate, during the evaporation phase, is pumped by means of a peristalic pump 231 through line 227 which passes through the wall of container 200b wherein it is received by a circular or partially circular ring manifold 232 to distribute same into a falling film on the inside wall of container 200b to enhance evaporation.

Figure 27:
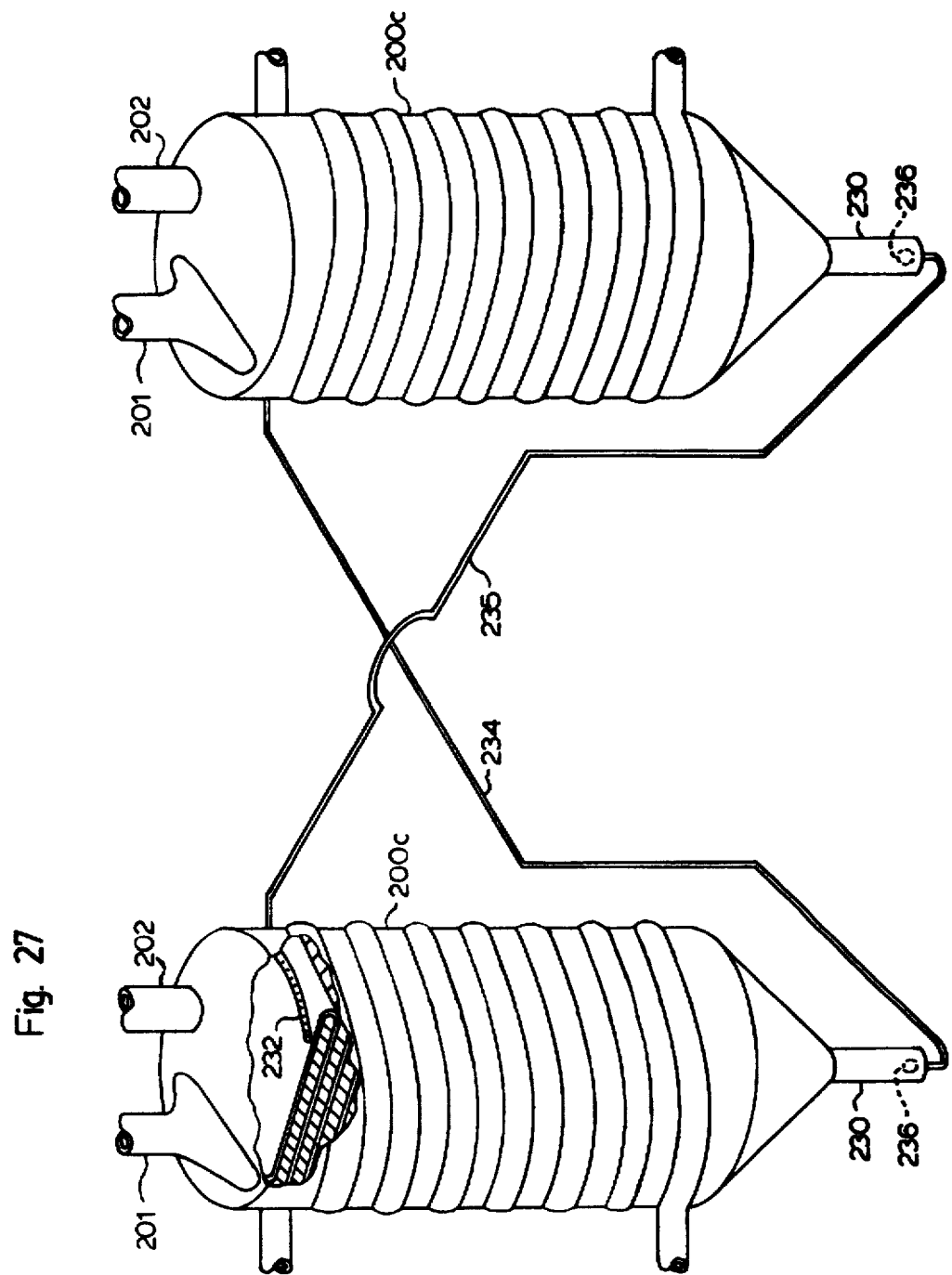
FIG. 27 illustrates a pair of converters having a condensate return loop crossover.

FIG. 27 illustrates a cross-over arrangement between containers 200c which are essentially identical to containers 200b. In this system, condensate in one container is caused by adsorption and thus a reduction of pressure in the other container to move therefrom via a cross-over line 234 or 235. If desired, a float valve 236 or 237 may be installed in each sump 230 to ensure that the condensate alone is transported by the pressure differential and no equalization of pressures in the containers 200c takes place. This may be assured for normal operation conditions by the head of water which occurs in lines 234 and 235 in any event which may be enhanced by raising the relative height of lines 234 and 235. For maximum efficiency, the oil outlet temperature from each container 200 is retained at or under a relatively low temperature (200°–300° F. (92° to 149° C.)) whereas for increased capacity its maximum permissible temperature is increased (300°–400° F. (149° to 205° C.)) before the oil flow is reversed. Controls of pumps 204 and 211 and valves 212 as well as boiler 205 are thermostatically controlled.

Although the preferred embodiments of the invention have been described, it is to be understood that it is capable of other adaptations and modifications within the scope of the appended claims.

For example, instead of using heated air directly as a heat transfer fluid, a number of liquids such as silicon oils, glycols, and the like may be used as heat transfer fluids. As seen in FIG. 15, liquids provide sharper temperature fronts and therefore result in higher COPs. Furthermore, the energy to circulate a liquid is less than required for gases for the same amount of BTUs transferred, thus reducing parasitic electrical consumption.

Having thus described my invention, what I claim as new and to be secured by Letters Patent of the United States is:

1. An efficient system for heat utilization which comprises:

a container defining an hermetically sealed space which contains heat exchange means, a refrigerant, an adsorbent material in thermal communication with said heat exchange means adapted to adsorb said refrigerant in response to temperature changes of said heat exchange means, condenser means for condensing said refrigerant and evaporator means for evaporating said refrigerant;

said heat exchange means comprising conduit means extending through said container and defining a passageway therethrough hermetically separate from said space;

circulation means operatively associated with said heat exchange means for selectively causing a fluid to flow through said conduit means, said fluid propagating a relatively sharp temperature from in said material which is sufficiently hot that as said refrigerant is desorbed from said material along said temperature front, the pressure of vapor of said refrigerant said space is increased, said vapor received by said condenser means is condensed into liquid and collected in said evaporator means, and further selectively and successively reversing fluid flow through said conduit means, said reversed flow fluid propagating a relatively sharp low temperature front to cool said adsorbent material whereby said refrigerant is reabsorbed along said low temperature front said material from said evaporator means and pressure of said vapor in said space is lowered;

control means for said selective and successive reversing of said fluid flow substantially on the respective completions of the propagation of each of said temperature fronts through said conduit means; and means for extracting energy from said condenser and said evaporator means.

2. A system in accordance with claim 1, wherein said adsorbent material is zeolite.

3. A system in accordance with claim 2, wherein said refrigerant is water.

4. A system in accordance with claim 2, wherein said first fluid after passing through said conduit means and having its temperature increased thereby is thereafter utilized as said reversed flow fluid and is heated by a low-grade heat source before being caused to flow through a further like heat exchange means in a further like container.

5. A system in accordance with claim 4, wherein said low-grade heat source is a mixture of air and combustion products.

6. A system in accordance with claim 4, wherein said low-grade heat source is waste heat.

7. A system in accordance with claim 4, wherein said low-grade heat source is solar energy.

8. A system in accordance with claim 4, wherein said fluid is substantially air.

9. A system in accordance with claim 4, wherein said conduit comprises a closed recirculating space which extends through said further like container.

10. A system in accordance with claim 9, wherein said fluid is a high temperature oil.

11. A system in accordance with claim 10, wherein said conduit in each said container is serpentine and has relative flat spaces between turns, said adsorbent material being received between said flat spaces and in surface to surface contact with said conduit.

12. A system in accordance with claim 11, wherein said conduit is composed of copper.

13. A system in accordance with claim 11, wherein said conduit is received in said container so as to prevent injurious vertical expansion by said conduit when the interior of the container surrounding said conduit and said adsorbent material is subjected to a partial vacuum.

14. A system in accordance with said claim 11, wherein said conduit in each said container is about thirty-five to sixty feet (10.6 to 18.3 meters) long.

15. A system in accordance with claim 14, wherein said conduit in each said container is about thirty-six feet (10.9 meters) long.

16. A system in accordance with claim 15, wherein said conduit's flat spaces have a height of about one-half inch (12 mm) and a horizontal depth of at least six inches (15.2 cm) and said adsorbent material between said flat spaces has a thickness throughout of about ¼" (6 mm).

17. A system in accordance with claim 10, wherein said conduit includes selectively reversible pumping means.

18. A system in accordance with claim 2, wherein said material is in an immediate thermal conduction arrangement with said conduit means and such components perform the function of causing said sharp temperature front to be propagated through said material in the direction of movement of said fluid when flowing therethrough.

19. A system in accordance with claim 1, wherein said container has substantially cylindrical sides and comprises said condenser means and said evaporator means with further conduit means Which circulates a liquid for cooling said condenser means and heating said evaporator means being incorporated in said sides.

20. Apparatus which receives its energy from a low-grade heat source and provides heating and cooling for the interior of a building, said apparatus being operable to execute reversible adsorption heat pump cycle, said apparatus comprising:

I. Two hermetically sealed spaces, each space including:
(a) an adsorbent material and a refrigerant, said adsorbent material being in thermal communication with a heat transfer fluid whereby in a desorption mode said fluid will provide heat to said material to desorb said refrigerant therefrom and in an adsorption mode said fluid will remove heat from said material to adsorb said refrigerant;
(b) condensing and vaporizing means for said refrigerant in thermal communication with said heat exchanger operative to exchange heat with said interior and selectively to heat or cool same;

II. Conduit means for conveying said heat transfer fluid which has been heated in the adsorption mode in one said space to be further heated by a low-grade heat source and received by other said space to heat said adsorbent in its desorption mode whereby heat may be supplied to said interior of a building from the respective condensing means of the spaces in the desorption mode or cooling supplied to said interior of a building from the respective vaporizing means of the spaces in the adsorption mode; and III. control means to reverse the flow of said heat transfer fluid upon substantial completion of the adsorption mode in one space and the desorption mode in the other space.

21. Apparatus in accordance with claim 20, wherein said adsorbent material is zeolite.

22. Apparatus in accordance with claim 21, wherein said refrigerant is water.

23. Apparatus in accordance with claim 21, wherein said low-grade heat source is a gas flame.

24. Apparatus in accordance with claim 21, wherein the thermal communication between said material and said heat exchange fluid is provided by a heat exchanger characterized by a relatively low longitudinal thermal conductivity and a thermal communication with said material sufficiently efficient so that a relatively sharp temperature front is propagated through said heat exchanger when said first heat exchange fluid is conveyed therethrough.

25. Apparatus in accordance with claim 24, wherein said heat exchangers are composed of an alloy metal having a thermal conductivity in quantity of heat in calories transmitted per second through a plate one centimeter across in an area of one square centimeter with a temperature difference of 1° C. which is not more than about 0.10.

26. Apparatus in accordance with claim 25, wherein said heat exchangers comprise tubes having a thickness of about one millimeter of less.

27. Apparatus in accordance with claim 26, wherein said material comprises sliced natural zeolite having thicknesses nor more than ten millimeters.

28. Apparatus in accordance with claim 20, wherein said heat transfer fluid is a high-temperature oil.

29. Apparatus in accordance with claim 28, wherein said conduit means comprises a closed recirculation channel which also includes selectively reversible pumping means.

30. A process for heating and cooling an interior space by using a low-grade heat source, the process comprising the steps of:

I. Providing first and second pressure tight enclosures, each enclosure having a working refrigerant, an adsorbent material, a condenser and evaporator means therein, said adsorbent material being in thermal communication with a conduit which is provided through each enclosure, said adsorbent material being capable of adsorbing said refrigerant exothermically;

II. Providing a low-grade heat source and means for it to be in selective thermal communication with said conduit for each said enclosure;

III. Raising the temperature of said material in a first of said enclosures in thermal communication with said conduit along a relatively sharp propagating temperature front said low-grade heat source;

IV Raising the vapor pressure of said refrigerant in said first enclosure and desorbing the refrigerant from said adsorbent material therein along said temperature front using said low-grade heat source;

V Allowing refrigerant vapor in said first enclosure to be received by said condenser therein, condensing said refrigerant vapor, and transferring said refrigerant's heat of condensation to said internal space or to the atmosphere;

VI. Lowering the temperature of said material in the second of said enclosures in thermal communication with said conduit along a relatively sharp propagation temperature front, lowering the vapor pressure of said refrigerant in said second enclosure by absorbing said refrigerant by said absorbent along said temperature front and transferring the heat of adsorption thereby generated to said first enclosure in combination with heat from said low-grade heat source via said conduits; and VIII. Repeating steps III through VII alternately in said enclosures upon substantial completion of the adsorption or desorption cycle therein.

31. A process in accordance with claim 30, wherein said adsorbent material is zeolite.

32. A process in accordance with claim 31, wherein said working, refrigerant is water.

33. A process in accordance with claim 31, wherein said low-grade heat source is a gas flame.

34. A process in accordance with claim 33, wherein said vapor pressure in step IV is increased to about fifty millimeters of murcury absolute.

35. A process in accordance with claim 33, wherein said refrigerant vapor in step V is condensed by said condenser at a temperature of about 100° F. (38° C.).

36. A process in accordance with claim 35, wherein said vapor pressure in step VI is reduced to at least ten millimeters of murcury absolute.

37. Apparatus for exchanging heat between a liquid and a solid adsorbent which comprises a conduit for said liquid which is composed of copper and has an effective thickness of about 0.5 millimeters or less, the thermal conductivity of said solid adsorbent being substantially less than said conduit, said solid adsorbent mounted on said conduit in immediate thermal communication therewith and having a thickness of not more than about six millimeters, said conduit and said solid adsorbent thereon being so arranged that a heat transfer takes place between said liquid flowing in said conduit and said solid adsorbent wherein said liquid and said solid adsorbent have different initial temperatures along a relatively sharp temperature front which moves along said solid adsorbent in the direction of said liquid's movement, the temperature of said solid behind said front being about the same as said liquid behind said front and the temperature of said solid adsorbent remaining at about its initial temperature forward of said front.

38. Apparatus in accordance with claim 37, wherein said solid adsorbent is zeolite.

39. Apparatus in accordance with claim 38, wherein said initial temperature is about 100° F. (38° C.).

40. Apparatus in accordance with claim 39, wherein said temperature of said zeolite at said front is about 400° F. (205° C.).

41. Apparatus in accordance with claim 40, wherein said liquid comprises a high-temperature oil having a maximum viscosity in the range of about five to ten centistokes.

42. An efficient apparatus for heat utilization comprised of two separate hermetically-sealed solid-gas adsorption systems, heat exchange means connecting said systems, said heat exchange means including conduit means for the passage of a heat exchange fluid, said conduit means received in said system in a heat exchange relationship with adsorption material therein, said connection of said systems by said heat exchange means being arranged so that heat generated during the adsorption cycle of one said system is used in substantial part through said heat exchange means in the desorption cycle of the other said system, said conduit means being arranged with respect to at least one said system so as to be in an immediate thermal conduction relationship with said adsorption material which is disposed in limited quantity therealong so that a relatively sharp temperature front is propagated through said material in the direction of movement of said fluid flowing therethrough having a significantly different temperature than the temperature of said material forward of said propagated temperature front, whereby the need for external energy input for said desorption is greatly reduced.

43. Apparatus in accordance with claim 42, wherein zeolite is said adsorbent in each said system.

44. Apparatus in accordance with claim 43, wherein $H_2O$ is the adsorbate which is adsorbed and desorbed by said zeolite in said systems.

45. Apparatus in accordance with claim 42, wherein said heat exchange means is similarly arranged with respect to both said systems so that relatively sharp temperature fronts are propagated substantially simultaneously through both said systems.

46. Apparatus in accordance with claim 42, wherein said fluid comprises air.

47. Apparatus in accordance with claim 42, wherein said fluid is a high-temperature oil.

48. A method of operating a heat pump system between an upper operating temperature and a lower operating temperature comprising two solid adsorbent beds connected to the condenser and evaporator in a heat pump circuit so that desorbed refrigerant can flow from the bed by being heated into the condenser and refrigerant from the evaporator can flow into the bed being cooled comprising the steps of:

a) placing a separate heat exchanger in a heat transfer relationship with each bed and connecting the heat exchangers in series with each other in a closed fluid loop so that heat transfer fluid flows around the closed loop serially through the heat exchangers;

b) heating the heat transfer fluid passing between one of the ends of the beds to the upper operating temperature;

c) cooling the heat transfer fluid passing between the other ends of the beds to the lower operating temperature;

d) circulating the heat transfer fluid around the closed fluid loop serially through the heat exchangers so that the heat transfer fluid passes generally lengthwise of both beds where the circulation rate of the heat transfer fluid is such that the heated heat transfer fluid passing into the end of the bed heats the solid adsorbent bed from an initial cool bed temperature in the vicinity of the lower operating temperature while the bed cools the heat transfer fluid from the upper operating temperature down to about the initial cool bed temperature in a distance less than the length of the bed and with the cooled heat transfer fluid passing into the end of the other bed cooling the solid adsorbent bed from an initial hot bed temperature in the vicinity of the upper operating temperature while the bed heats the heat transfer fluid from the lower operating temperature up to about the initial hot bed temperature in a distance less than the length of the bed;

e) when the exit temperature of the heat transfer fluid passing out of either of the beds shifts from the initial temperature of that bed by a prescribed amount less than about fifty percent (50%) of the difference between the initial bed temperature and inlet fluid temperature in step (b), changing the circulation of the heat transfer fluid so that the heated heat transfer fluid passes through the cooled bed and the cooled heat transfer fluid passes through the heated bed; and f) when the exit temperature of the heat transfer fluid passing our of either of the beds shifts from the initial temperature of that bed by said prescribed amount in step (c), changing the circulation of the heat transfer fluid to step (b) to cycle the beds between the upper and lower operating temperatures.

49. The method of claim 48 wherein the heat transfer fluid is serially circulated through the beds in a first direction lengthwise of the beds during step (b) and in the opposite direction during step (c).

50. The method of claim 48 wherein the initial bed temperature of each of the beds during heating is the temperature to which the bed is raised from the lower operating temperature by pressurizing the bed from evaporator pressure to condenser pressure and the initial bed temperature of each of the beds during cooling is the temperature to which the bed is lowered from the upper operating temperature by depressurizing the bed from condenser pressure to evaporator pressure.

51. A heat pump system comprising:

a pair of solid adsorbent beds (136/183 in 120 and 121);

a heat pump circuit (120/121, 122, 124) connected to said solid adsorbent beds (136/183) so that said heat pump circuit (120/121, 122, 124) is driven in response to the heating and cooling of said beds (136/183);

a heat transfer fluid (air, including, if heated by gas fuel, some combustion gases);

a pair of bed heat exchange means (120/125, 121/125), one of said bed heat exchange means operatively associated with each of said beds (136/183) so that the heat transfer fluid passing through each of said heat exchange means passes lengthwise (FIG. 9) of said bed associated therewith in a single pass and each of said heat exchange means having opposed ends (192);

heating means (130) adapted to heat said exchange fluid to a prescribed upper operating temperature (400° F.) connecting (by 127 and 131) one of the ends of both of said bed heat exchange means (120/125, 121/125);

cooling means (170, 171, 172) adapted to cool said heat exchange fluid to a prescribed lower operating temperature (100° F.) connecting (via 126, 132) the other of the ends of both of said bed heat exchange means (120/125, 121/125) so that said heat transfer fluid can flow serially from said heating means (130), through one of said bed heat exchange means (121/125), through said cooling means, through the other of said bed heat exchange means (120/125) and back to said heating means (130) to define a heat transfer circuit;

circulation means (151 or 152) for alternatively circulating said heat transfer fluid (air) in one direction around the heat transfer circuit so that one of said beds (120, 136/183) is cooled while the other of said/beds (121, 136/183) is heated, and in the alternate direction around the heat transfer circuit so that said other of said beds (121, 136/183) is cooled while said one of said beds (120, 136/183) is heated where the circulation rate of the heat transfer fluid is such that the heated heat transfer fluid passing into the end of one of said heat exchange means heats said solid adsorbent bed associated therewith from an initial cool bed temperature (100° F., FIG. 4) in the vicinity of the lower operating temperature (100° F.) while said bed cools the heat transfer fluid from the upper operating temperature (400° F.) down to about the initial cool bed temperature (100° F.) in a distance less than the length of said bed and with the cooled heat transfer fluid passing into the end of the other of said heat exchanger means cooling said solid adsorbent bed associated therewith from an initial hot bed temperature (400° F., FIG. 4) in the vicinity of the upper operating temperature (400° F.) while said bed heats the heat transfer fluid from the lower operating temperature (100° F.) up to about the initial hot bed temperature (400° F.) in a distance less than the length of the bed in order for heat exchanged between said heat transfer fluid and each of said beds to generate a thermal wave in the temperature profiles lengthwise of said beds moving through each of said beds (see FIGS. 6, 15 and 16); and control means (sensors in 126, 127, 131 and 132) operatively associated with said heat transfer fluid passing out of said beds and with said circulation means (151 or 152) to cause said circulation means to reverse the circulation direction of said heat transfer fluid (air) around said heat transfer circuit when either of the thermal wave reaches that end of said bed (136/183) from which said heat transfer fluid (air) exits.

52. A method of operating a heat pump system including a heat pump loop and a heating loop where the heat pump loop includes a pair of solid adsorbent beds connected to a condenser and an evaporator with an expansion device therebetween so that refrigerant flows from the bed being heated to the condenser while the refrigerant can flow from the evaporator to the bed being cooled, and where the heating loop includes a heat exchanger associated with each bed design so that when a heat transfer fluid is flowing therethrough, a thermal temperature gradient or wave will be generated along the bed together with a cooling heat exchanger between one of the ends of the beds and a heating means between the other ends of the beds comprising the steps of:

circulating the heat transfer fluid around the heating loop until the exit temperature of the heat transfer fluid passing out of either of the beds shifts from the initial temperature of that bed by at least about twenty percent (20%) of the difference between the initial bed temperature and inlet fluid temperature; and then reversing the flow of the heat transfer fluid around the heating loop each time the exit temperature of the heat transfer fluid passing out of either of the beds shifts from the initial temperature of that bed by at least about twenty percent (20%) of the difference between the initial bed temperature and inlet fluid temperature.

53. A heat pump system comprising:

a pair of solid adsorbent beds;

a heat pump circuit connected to said solid adsorbent beds so that said heat pump circuit is driven in response to the heating and cooling of said beds;

a heat transfer fluid;

a pair of bed heat exchange means, one of said bed heat exchange means operatively associated with each of said beds so that the heat transfer fluid passing through each of said heat exchange means passes lengthwise of said bed associated therewith in a single pass and each of said heat exchange means having opposed ends;

heating means adapted to heat said heat exchange fluid to a prescribed upper operating temperature connecting one of the ends of both of said bed heat exchange means;

cooling means adapted to cool said heat exchange fluid to a prescribed lower operating temperature connecting the other ends of both of said bed heat exchange means so that said heat transfer fluid can flow serially from said heating means, through one of said bed heat exchange means, through said cooling means, through the other of said bed heat exchange means and back to said heating means to define a heat transfer circuit;

circulation means for alternatively circulating said heat transfer fluid in one direction around the heat transfer circuit so that one of said beds is cooled while the other of said beds is heated, and in the alternate direction around the heat transfer circuit so that said other of said beds is cooled while said one of said beds is heated where the circulation rate of the heat transfer fluid is such that the heated heat transfer fluid passing into the end of one of said heat exchange means heats said solid adsorbent bed associated therewith from an initial cool bed temperature in the vicinity of the lower operating temperature while said bed cools the heat transfer fluid from the upper operating temperature down to about the initial cool bed temperature in a distance less than 0.8 times the length of said bed and with the cooled heat transfer fluid passing into the end of the other of said heat exchanger means cooling said solid adsorbent bed associated therewith from an initial hot bed temperature in the vicinity of the upper operating temperature while said bed heats the heat transfer fluid from the lower operating temperature up to about the initial hot bed temperature in a distance less than 0.8 times the length of the bed in order for heat exchanged between said heat transfer fluid and each of said beds to generate a thermal wave in the temperature profiles lengthwise of said beds moving through each of said beds; and control means operatively associated with said heat transfer fluid passing out of said beds and with said circulation means to cause said circulation means to reverse the circulation direction of said heat transfer fluid around said heat transfer circuit when either of the thermal wave reaches that end of said bed from which said heat transfer fluid exits.

54. A method of operating a heat pump system including a heat pump loop and a heating loop where the heat pump loop includes a pair of solid adsorbent beds connected to a condenser and an evaporator with an expansion device therebetween so that refrigerant flows from the bed being heated to the condenser while the refrigerant can flow from the evaporator to the bed being cooled, and where the heating loop includes a heat exchanger associated with each bed designed so that when a heat fluid is flowing therethrough, a thermal temperature gradient or wave will be generated along the bed together with a cooling heat exchanger between one of the ends of the beds and a heating means between the other ends of the beds comprising the steps of:

circulating the heat transfer fluid around the heating loop to drive the heat pump loop; and varying the heat transfer fluid flow rate to vary the heating and cooling capacity of the system.

55. A method of operating a heat pump system including a heat pump loop (200c, 207, 234, 235) and a heating loop (205-202-200c-201-204-201-200c-202) where the heat pump loop includes a pair of solid adsorbent beds (196, 190) connected to a condenser (200c, 196, 190) and an evaporator (200c, 196, 190) with an expansion device (234, 235, 236, 232) therebetween so that refrigerant flows from the bed being heated (196, 190) to the condenser (200c, 207) while the refrigerant (water) can flow from the evaporator (200c, 207) to the bed (196, 190) being cooled, and where the heating loop (205-202-200c-201-204-201-200c-202) includes a heat exchanger (196, 194) associated with each bed (196, 190) designed so that when a heat fluid is flowing therethrough, a thermal temperature gradient or wave (FIGS. 15, 16) will be generated along the bed (196, 190) together with a cooling heat exchanger (Page 36, lines 18–20) between one the ends (FIG. 22) of the beds (196, 190) and a heating means (205) between the other ends (FIG. 22) of the beds (196, 190) comprising the steps of:

circulating (by variable speed gear pump 204) the heat transfer fluid (high temperature oil) around the heating loop (205-202-200c-204-201-200c-202) at a prescribed flow rate (inherent in pump 204) to drive the heat pump loop (200c, 207, 234, 235); and varying the heat output of the heating means (thermostatically controlled boiler 205) to vary the heating cooling capacity of the system (inherent in system).

56. A method of operating a heat pump system including a heat pump loop and a heating loop where the heat pump loop includes a pair of solid adsorbent beds connected to a condenser and an evaporator with an expansion device therebetween so that refrigerant flows from the bed being heated to the condenser while the refrigerant can flow from the evaporator to the bed being cooled, and where the heating loop includes a heat exchanger associated with each bed designed so that when a heat fluid is flowing therethrough, a thermal temperature gradient or wave will be generated along the bed together with a cooling heat exchanger between one of the ends of the beds and a heating means between the other ends of the beds comprising the steps of:

circulating the heat transfer fluid around the heating loop until the exit temperature of the heat transfer fluid passing out of either of the beds shifts from the initial temperature of that bed by a prescribed percentage of the difference between the initial bed temperature and inlet fluid temperature;

then reversing the flow of the heat transfer fluid around the heating loop each time the exit temperature of the heat transfer fluid passing out of either of the beds shifts from the initial temperature of that bed by said prescribed percentage of the difference between the initial bed temperature and inlet fluid temperature; and varying the heating capacity of the system by varying said prescribed percentage whereby the heating capacity is increased as said prescribed percentage is increased and vice versa.

57. The method of claim 56 further including the step of configuring the beds and heat exchangers so that the thermal wave generated in the beds has a wavelength less than about 0.8 times the bed length.

58. The method of claim 56 further including the step of varying the heat transfer fluid flow rate to vary the heating and cooling capacity of the system.

59. The method of claim 56 further including the step of varying the heating capacity of the system by varying the percentage above twenty percent (20%) of the exit temperature shift of the heat transfer fluid with respect to the difference between initial bed temperature and inlet fluid temperature before the flow of heat transfer fluid is reversed.

60. The method of claim 56 further including the step of varying the output temperature of the heat transfer fluid from the heating means to vary the heating and cooling capacity of the system.

61. The method of claim 57 wherein the thermal wavelength is less than about 0.7 times the bed length.

62. The method of claim 61 further including the step of varying the heat transfer fluid flow rate to vary the heating and cooling capacity of the system.

63. The method of claim 62 where the system is designed based on a prescribed set of operating parameters and further includes the step of varying the heating and cooling capacity of the system by:

(a) varying the heating and cooling capacity by varying the heat transfer fluid flow rate when the system is operating below said prescribed set of operating parameters; and (b) varying the heating capacity by varying the percentage above twenty percent (20%) of the exit temperature shift of the heat transfer fluid with respect to the difference between initial bed temperature and inlet fluid temperature before the flow of heat transfer fluid is reversed when the system is operating above said prescribed set of operating parameters.

64. The system of claim 53 wherein said control means is constructed and arranged to reverse the direction of heat transfer fluid flow when the exit temperature of the heat transfer fluid flow passing out of either of the beds shifts from the initial temperature of that bed by at least about twenty percent (20%) of the difference between the initial bed temperature and inlet fluid temperature.

65. The system of claim 53 wherein the thermal wavelength is less than about 0.7 times the bed length.

66. An efficient system for heat utilization which comprises:

a container defining an hermetically sealed space which contains heat exchange means, a refrigerant, an adsorbent material in thermal communication with said heat exchange means adapted to adsorb and desorb said refrigerant in response to temperature changes of said heat exchange means, condenser means for condensing said refrigerant and evaporator means for evaporating said refrigerant;

said heat exchange means comprising conduit means extending through said container and defining a passageway therethrough hermetically separate from said space;

circulation means operatively associated with said heat exchange means and with control means for selectively causing a heated fluid to flow through said conduit means, said conduit means being in sufficiently effective thermal communication with said fluid and said adsorbent material that said fluid propagates a relatively sharp high temperature front that moves in said adsorbent material in the same direction as said fluid flows in said conduit means and causes said refrigerant to be desorbed from said adsorbent material along said temperature front, whereby the pressure of vapor of said refrigerant in said space is raised, said condenser means adapted to receive said vapor and condense it into liquid whereupon said evaporator means receives said condensed liquid, said circulation means and said control means further selectively and successively reversing fluid flow through said conduit means so that said relatively cool reversed flowing fluid propagates a relatively sharp low temperature front to cool said adsorbent material whereby said refrigerant is reabsorbed by said adsorbent material along said low temperature front, said refrigerant being evaporated from said evaporator means and pressure of said vapor in said space being lowered;

said control means adapted to effect said selective and successive reversing of said fluid flow substantially on respective completions of the propagation of each of said temperature fronts through said adsorbent material; and means for extracting energy selectively from said condenser means and said evaporator means.

67. A method of operating a heat pump system between an upper operating temperature and a lower operating temperature comprising two solid adsorbent beds connected to condenser means and evaporator means in a heat pump circuit so that desorbed refrigerant can flow from the bed by being heated into the condenser means and refrigerant from the evaporator means can flow into the bed being cooled, the method comprising the steps of:

(a) placing a separate heat exchanger in a heat transfer relationship with each bed and connecting the heat exchangers in series with each other in a fluid loop so that heat transfer fluid flows in the loop serially through the heat exchangers;

(b) heating the heat transfer fluid passing between one of the ends of the beds to the upper operating temperature;

(c) cooling the heat transfer fluid passing between the other ends of the beds to the lower operating temperature;

(d) circulating the heat transfer fluid in the fluid loop serially through the heat exchangers so that the heat transfer fluid passes generally through the effective length of both beds, the circulation rate of the heat transfer fluid being such that the heated heat transfer fluid passing into the end of the bed heats that solid adsorbent bed from an initial cool bed temperature while that bed cools the heat transfer fluid from the upper operating temperature down to about the initial cool bed temperature in a distance less than the effective length of that bed and with the cooled heat transfer fluid passing into the end of the other bed cooling such other solid adsorbent bed from an initial hot bed temperature in the vicinity of the upper operating temperature while such other bed heats the heat transfer fluid from the lower operating temperature up to about the initial hot bed temperature in a distance less than the effective length of such other bed;

(e) upon the exit temperature of the heat transfer fluid passing out of either of the beds shifting from the initial temperature of that bed by a selected amount which is less than about fifty percent (50%) of the difference between the initial bed temperature and inlet fluid temperature in step (b), changing the circulation of the heat transfer fluid so that the heated heat transfer fluid passes through the just cooled bed and the cooled heat transfer fluid passes through the just heated bed; and (f) upon the exit temperature of the heat transfer fluid passing out of either of the beds shifting from the initial temperature of that bed by said selected amount in step (c), changing the circulation of the heat transfer fluid to step (b) to cycle the beds between the upper and lower operating temperatures.

68. The method of claim 67 wherein each of said beds comprises a plurality of tiles composed of zeolite.

69. A heat pump system comprising:

a pair of solid adsorbent beds;

a heat pump circuit connected to said solid adsorbent beds so that said heat pump circuit is driven in response to the heating and cooling of said beds;

a heat transfer fluid;

a pair of bed heat exchange means, each one of said bed heat exchange means operatively associated with a respective one of said beds so that the heat transfer fluid passes through the effective length each of said heat exchange means associated therewith each respective bed in a single pass, each said heat exchange means having opposed ends;

heating means adapted to heat said heat exchange fluid to a prescribed upper operating temperature connecting one of the ends of both of said bed heat exchange means;

cooling means adapted to cool said heat exchange fluid to a prescribed lower operating temperature connecting the other of the ends of both of said bed heat exchange means so that said heat transfer fluid can flow from said heating means, through one of said bed heat exchange means, through said cooling means and back through the other of said bed heat exchange means to said heating means to define a heat transfer circuit;

circulation means for alternatively circulating said heat transfer fluid in one direction in the heat transfer circuit so that one of said beds is cooled while the other of said beds is heated, and in the alternate direction in heat transfer circuit so that said other of said beds is cooled while said one of said beds is heated, the circulation rate of the heat transfer fluid being such that the heated heat transfer fluid passing into the end of one of said bed heat exchange means heats said solid adsorbent bed associated therewith from an initial cool bed temperature in the vicinity of the lower operating temperature while said bed cools the heat transfer fluid from the upper operating temperature down to about the initial cool bed temperature in a distance less than the length of said bed and with the cooled heat transfer fluid passing into the end of the other of said bed heat exchanger means cooling said solid adsorbent bed associated therewith from an initial hot bed temperature in the vicinity of the upper operating temperature while said bed heats the heat transfer fluid from the lower operating temperature up to about the initial hot bed temperature in a distance less than the length of the bed in order for heat exchanged between said heat transfer fluid and each of said beds to generate a thermal wave in the temperature profiles moving through the effective length of each of said beds; and control means operatively associated with said heat transfer fluid passing out of said beds and with said circulation means to cause said circulation means to reverse the circulation of said heat transfer fluid around said heat transfer circuit when either of the thermal wave reaches that end of said bed from which said heat transfer fluid exits.

70. The heat pump system of claim 69 wherein each of said beds comprises a plurality of tiles which are composed of zeolite.

71. A method of operating a heat pump system that includes a pair of solid adsorbent beds connected to condenser means and evaporator means so that refrigerant flows from the bed being heated to said condenser means while the refrigerant flows from said evaporator means to the bed being cooled, and includes a bed heat exchanger associated with each bed which is designed so that when a heat transfer fluid flows therethrough, a thermal temperature gradient or wave is generated along each bed, the method comprising the steps of:

circulating the heat transfer fluid through said bed heat exchangers until the exit temperature of the heat transfer fluid passing out of either of the beds shifts from the initial temperature of that bed by at least about twenty percent (20%) of the difference between the initial bed temperature and inlet fluid temperature; and then reversing the flow of the heat transfer fluid in each of said beds each time the exit temperature of the heat transfer fluid passing out of either of the beds shifts from the initial temperature of that bed by at least about twenty percent (20%) of the difference between the initial bed temperature and inlet fluid temperature.

72. A heat pump system comprising:

a pair of solid adsorbent beds;

a heat pump circuit connected to said solid adsorbent beds so that said heat pump circuit is driven in response to the heating and cooling of said beds;

a heat transfer fluid;

a pair of bed heat exchange means, each one of said bed heat exchange means operatively associated with a respective one of said beds so that the heat transfer fluid passes through each of said bed heat exchange means in a single pass, each of said bed heat exchange means having opposed ends;

heating means adapted to heat said heat exchange fluid to prescribed upper operating temperature connecting one of the ends of both of said bed heat exchange means;

cooling means adapted to cool said heat exchange fluid to a prescribed lower operating temperature connecting the other of the ends of both of said bed heat exchange means so that said heat transfer fluid flows from said heating means, through one of said bed heat exchange means, through said cooling means, back through the other of said bed heat exchange means to said heating means to define a heat transfer circuit;

circulation means for alternatively circulating said heat transfer fluid in one direction around the heat transfer circuit so that one of said beds is cooled while the other of said beds is heated, and in the alternate direction around the heat transfer circuit so that said other of said beds is cooled while said one of said beds is heated, the rate of circulation rate the heat transfer fluid being such that the heated heat transfer fluid passing into the end of one of said bed heat exchange means heats said solid adsorbent bed associated therewith from an initial cool bed temperature in the vicinity of the lower operating temperature while said bed cools the heat transfer fluid from the upper operating temperature down to about the initial cool bed temperature in a distance less than about 0.8 times the effective length of said bed and with the cooled heat transfer fluid passing into the end of the other of said bed heat exchanger means cooling said solid adsorbent bed associated therewith from an initial hot bed temperature in the vicinity of the upper operating temperature while said bed heats the heat transfer fluid from the lower operating temperature up to about the initial hot bed temperature in a distance less than about 0.8 times the effective length of the bed in order for heat exchanged between said heat transfer fluid and each of said beds to generate a thermal wave in the temperature profiles lengthwise of said beds moving through each of said beds; and control means operatively associated with said heat transfer fluid passing out of said beds and with said circulation means to cause said circulation means to reverse the circulation direction of said heat transfer fluid around said heat transfer circuit about when either of the thermal wave reaches that end of said bed from which said heat transfer fluid exits.

73. A method of operating a heat pump system including a heat pump loop and a heating loop where the heat pump loop includes a pair of solid adsorbent beds connected to a condenser and an evaporator with an expansion device therebetween so that refrigerant flows from the bed being heated to the condenser while the refrigerant flows from the evaporator to the bed being cooled, and where the heating loop includes a heat exchanger associated with each bed designed so that when a heat fluid is flowing therethrough, a thermal temperature gradient or wave is generated along each bed, together with a cooling heat exchanger between one of the ends of the beds and a heating means between the other ends of the beds, the method comprising the steps of:

circulating the heat transfer fluid around the heating loop to drive the heat pump loop; and providing means for varying the heat transfer fluid flow rate to vary the heating and cooling capacity of the system.

74. A method of operating a heat pump system including a heat pump loop and a heating loop where the heat pump loop includes a pair of solid adsorbent beds connected to a condenser and an evaporator with an expansion device therebetween so that refrigerant flows from the bed being heated to the condenser while the refrigerant can flow from the evaporator to the bed being cooled, and where the heating loop includes a heat exchanger associated with each bed designed so that when a heated fluid is flowing therethrough, a thermal temperature gradient or wave is generated along the bed, together with a cooling heat exchanger between one of the ends of the beds and a heating means between the other ends of the beds, the method comprising the steps of:

circulating the heat transfer fluid around the heating loop at a selected flow rate to drive the heat pump loop; and varying the heat output of the heating means to vary the heating and cooling capacity of the system.

75. A method of operating a heat pump system including a heat pump loop and a heating loop where the heat pump loop includes a pair of solid adsorbent beds connected to condenser means and evaporator means with an expansion device between said beds so that refrigerant flows from the bed being heated to said condenser means while the refrigerant flows from said evaporator means to the bed being cooled, and where the heating loop includes a heat exchanger associated with each bed designed so that when a heated fluid is flowing therethrough, a thermal temperature gradient or wave is generated along the bed, together with a cooling heat exchanger between one of the ends of the beds and a heating means between the other ends of the beds, the method comprising the steps of:

circulating the heat transfer fluid around the heating loop until the exit temperature of the heat transfer fluid passing out of either of the beds shifts from the Initial temperature of that bed by a prescribed percentage of the difference between the initial bed temperature and inlet fluid temperature;

then reversing the flow of the heat transfer fluid around the heating loop each time the exit temperature of the heat transfer fluid passing out of either of the beds shifts from the initial temperature of that bed by said prescribed percentage of the difference between the initial bed temperature and inlet fluid temperature; and varying the heating capacity of the system by varying said prescribed percentage whereby the heating capacity is increased as said prescribed percentage is increased and vice versa.

76. A heat pump system comprising:

a pair of solid adsorbent beds;

a heat pump circuit connected to said solid adsorbent beds so that said heat pump circuit is driven in response to the heating and cooling of said beds;

a heat transfer fluid;

a pair of bed heat exchange means, one of said bed heat exchange means operatively associated with each of said beds so that the heat transfer fluid passing through each of said heat exchange means passes lengthwise of said bed associated therewith in a single pass and each of said heat exchange means having opposed ends;

heating means adapted to heat said heat transfer fluid to a prescribed upper operating temperature connecting one of the ends of both of said bed heat exchange means so that said heat transfer fluid can flow serially from said heating means, through one of said bed heat exchange means, through the other of said bed heat exchange means and back to said heating means to define a heat transfer circuit;

circulation means for alternatively circulating said heat transfer fluid in one direction around the heat transfer circuit so that one of said beds is cooled while the other of said beds is heated, and in the alternate direction around the heat transfer circuit so that said other of said beds is cooled while said one of said beds is heated where the circulation rate of the heat transfer fluid is such that the heated heat transfer fluid passing into the end of one of said heat exchange means heats said solid adsorbent bed associated therewith from an initial cool bed temperature in the vicinity of the heat transfer fluid's lower operating temperature while said bed cools the heat transfer fluid from the upper operating temperature down to about the initial cool bed temperature in a distance less than the length of said bed and with the cooled heat transfer fluid passing into the end of the other of said heat exchanger means cooling said solid adsorbent bed associated therewith from an initial hot bed temperature in the vicinity of the upper operating temperature while said bed heats the heat transfer fluid from the lower operating temperature up to about the initial hot bed temperature in a distance less than the length of the bed in order for heat exchanged between said heat transfer fluid and each of said beds to generate a thermal wave in the temperature profiles lengthwise of said beds moving through each of said beds; and control means operatively associated with said heat transfer fluid passing out of said beds and with said circulation means to cause said circulation means to reverse the circulation direction of said heat transfer fluid around said heat transfer circuit when either of the thermal wave reaches that end of said bed from which said heat transfer fluid exits.

77. A heat pump system in accordance with claim 76 wherein means adapted to cool said heat exchange fluid to lower operating temperature is provided between the other ends of both said bed heat exchange means and is included in said heat transfer circuit.

78. A method of operating a heat pump system including a heat pump loop and a heating loop where the heat pump loop includes a pair of solid adsorbent beds connected to a condenser and an evaporator with a pressure reducing device therebetween so that refrigerant flows from the bed being heated to the condenser while the refrigerant can flow from the evaporator to the bed being cooled, and where the heating loop includes a heat exchanger associated with each bed designed so that when a heat fluid is flowing therethrough, thermal temperature gradient or wave will be generated along the bed together with a heating means between one of the ends of the beds comprising the steps of:

circulating the heat transfer fluid around the heating loop at a prescribed flow rate to drive the heat pump loop; and varying the heat output of the heating means to vary the heating and cooling capacity of the system.

79. A method in accordance with claim 78 wherein the heat pump system comprises a heat exchanger which cools said heat fluid provided between the other ends of the beds.

80. A method of operating a heat pump system that includes a pair of solid adsorbent beds connected to condenser means and evaporator means so that refrigerant flows from the bed being heated to said condenser means while the refrigerant flows from said evaporator means to the bed being cooled, and includes a bed heat exchanger associated with each bed which is designed so that when a heat transfer fluid flows therethrough, a thermal temperature gradient or wave is generated along each bed, heating means for heating said transfer fluid between the first ends of the beds, a cooling heat exchanger between the other ends of the beds, the method comprising the steps of:

circulating the heat transfer fluid through said bed heat exchangers until the exit temperature of the heat transfer fluid passing out of either of the beds shifts from the initial temperature of that bed by at least about twenty percent (20%) of the difference between the initial bed temperature and inlet fluid temperature; and then reversing the flow of the heat transfer fluid in each of said beds each time the exit temperature of the heat transfer fluid passing out of either of the beds shifts from the initial temperature of that bed by at least about twenty percent (20%) of the difference between the initial bed temperature and inlet fluid temperature.

81. A heat pump system comprising:

a pair of solid adsorbent beds;

a heat pump circuit connected to said solid adsorbent beds so that said heat pump circuit is driven in response to the heating and cooling of said beds;

a heat transfer fluid;

a heat transfer circuit adapted to serially pass said heat transfer fluid through said beds with said heat transfer fluid entering the end of one of said beds at the upper operating temperature and with the heat transfer fluid entering the end of the other of said beds at the lower operating temperature;

a pair of bed heat exchange means, one of said bed heat exchange means operatively associated with each of said beds so that the heat transfer fluid passing through each of said heat exchange means passes lengthwise of said bed associated therewith in a single pass and each of said heat exchange means having opposed ends;

circulation means for alternatively circulating said heat transfer fluid in one direction around the heat transfer circuit so that one of said beds is cooled while the other of said beds is heated, and in the alternate direction around the heat transfer circuit so that said other of said beds is cooled while said one of said beds is heated where the circulation rate of the heat transfer fluid is such that the heated heat transfer fluid passing into the end of one of said heat exchange means heats said solid adsorbent bed associated therewith from an initial cool bed temperature in the vicinity of the lower operating temperature while said bed cools the heat transfer fluid from the upper operating temperature down to about the initial cool bed temperature in a distance less than the length of said bed and with the cooled heat transfer fluid passing into the end of the other of said heat exchanger means cooling said solid adsorbent bed associated therewith from an initial hot bed temperature in the vicinity of the upper operating temperature while said bed heats the heat transfer fluid from the lower operating temperature up to about the initial hot bed temperature in a distance less than the length of the bed in order for heat exchanged between said heat transfer fluid and each of said beds to generate a thermal wave in the temperature profiles lengthwise of said beds moving through each of said beds; and control means operatively associated with said heat transfer fluid passing out of said beds and with said circulation means to cause said circulation means to reverse the circulation direction of said heat transfer fluid around said heat transfer circuit when either of the thermal waves reaches that end of said bed from which said heat transfer fluid exits.

82. A method of operating a heat pump system that includes a pair of solid adsorbent beds connected to condenser means and evaporator means so that refrigerant flows from the bed being heated to said condenser means while the refrigerant flows from said evaporator means to the bed being cooled, and includes a bed heat exchanger associated with each bed which is designed so that, when a heat transfer fluid flows therethrough, a thermal temperature wave or front is generated along each bed, the method comprising the steps of:

circulating the heat transfer fluid through said bed heat exchangers until the thermal temperature wave or front reaches the end of the bed; and then reversing the flow of the heat transfer fluid in each of said beds each time the thermal temperature wave or front reaches the end of the bed.

83. A heat pump system comprising:

a pair of solid adsorbent beds;

a heat pump circuit connected to said solid adsorbent beds so that said heat pump circuit is driven in response to the heating and cooling of said beds;

a heat transfer fluid;

a heat transfer circuit adapted to serially pass said heat transfer fluid through said beds with said heat transfer fluid entering the end of one of said beds at the upper operating temperature and with the heat transfer fluid entering the end of the other of said beds at the lower operating temperature;

a pair of bed heat exchange means, one of said bed heat exchange means operatively associated with each of said beds so that the heat transfer fluid passing through each of said heat exchange means passes lengthwise of said bed associated therewith in a single pass and each of said heat exchange means having opposed ends;

circulation means for alternatively circulating said heat transfer fluid in one direction around the heat transfer circuit so that one of said beds is cooled while the other of said beds is heated, and in the alternate direction around the heat transfer circuit so that said other of said beds is cooled while said one of said beds is heated where the circulation rate of the heat transfer fluid is such that the heated heat transfer fluid passing into the end of one of said heat exchange means heats said solid adsorbent bed associated therewith from an initial cool bed temperature in the vicinity of the lower operating temperature while said bed cools the heat transfer fluid from the upper operating temperature down to about the initial cool bed temperature in a distance less than the length of said bed and with the cooled heat transfer fluid passing into the end of the other of said heat exchanger means cooling said solid adsorbent bed associated therewith from an initial hot bed temperature in the vicinity of the upper operating temperature while said bed heats the heat transfer fluid from the lower operating temperature up to about the initial hot bed temperature in a distance less than the length of the bed in order for heat exchanged between said heat transfer fluid and each of said beds to generate a thermal wave in the temperature profiles lengthwise of said beds moving through each of said beds; and control means operatively associated with said heat transfer fluid passing out of said beds and with said circulation means to cause said circulation means to reverse the circulation direction of said heat transfer fluid around said heat transfer circuit when the temperature of said heat transfer fluid exiting either of said beds changes a prescribed amount less than about fifty percent (50%) of the difference between the temperature of said bed when said heat transfer fluid circulation direction was last reversed and the temperature of the heat transfer fluid entering the bed.

84. A method of operating a heat pump system that includes a pair of solid adsorbent beds connected to condenser means and evaporator means so that refrigerant flows from the bed being heated to said condenser means while the refrigerant flows from said evaporator means to the bed being cooled, and includes a bed heat exchanger associated with each bed which is designed so that when a heat transfer fluid flows therethrough, a thermal temperature gradient or wave is generated along each bed, the method comprising the steps of:

circulating the heat transfer fluid through said bed heat exchangers until the exit temperature of the heat transfer fluid passing out of either of the beds shifts from the initial temperature of that bed by less than about fifty percent (50%) of the difference between the initial bed temperature and inlet fluid temperature; and then reversing the flow of the heat transfer fluid in each of said beds each time the exit temperature of the heat transfer fluid passing out of either of the beds shifts from the initial temperature of that bed by less than about fifty percent (50%) of the difference between the initial bed temperature and inlet fluid temperature.

85. A method of operating a heat pump system including a heat pump loop and a heating loop where the heat pump loop includes a pair of solid adsorbent beds connected to a condenser and an evaporator with an expansion device therebetween so that refrigerant flows from the bed being heated to the condenser while the refrigerant can flow from the evaporator to the bed being cooled, and where the heating loop includes a heat exchanger associated with each bed designed so that when a heat transfer fluid is flowing therethrough, a thermal temperature gradient or wave will be generated along the bed together with a cooling heat exchanger between one of the ends of the beds and a heating means between the other ends of the beds comprising the steps of:

circulating the heat transfer fluid around the heating loop to drive the heat pump loop; and varying the heating and cooling capacity of the system by one of the following substeps:
  a) varying the heat transfer fluid flow rate,
  b) varying the heat output of the heating means, or
  c) varying the prescribed percentage of the difference between the initial bed temperature and inlet fluid temperature that the exit temperature of the heat transfer fluid passing out of either of the beds shifts from the initial temperature of that bed whereby the heating capacity is increased as said prescribed percentage is increased and vice versa.

* * * * *